United States Patent
Wang et al.

(10) Patent No.: US 9,311,743 B2
(45) Date of Patent: Apr. 12, 2016

(54) SELECTIVELY MERGING PARTIALLY-COVERED TILES TO PERFORM HIERARCHICAL Z-CULLING

(71) Applicant: QUALCOMM Incorporated, San Diego, CA (US)

(72) Inventors: Tao Wang, Sunnyvale, CA (US); Andrew Evan Gruber, Arlington, MA (US); Shambhoo Khandelwal, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 14/061,506

(22) Filed: Oct. 23, 2013

(65) Prior Publication Data

US 2015/0109293 A1 Apr. 23, 2015

(51) Int. Cl.
*G06T 15/40* (2011.01)
*G06T 15/00* (2011.01)
*G06T 1/60* (2006.01)

(52) U.S. Cl.
CPC .............. *G06T 15/405* (2013.01); *G06T 1/60* (2013.01); *G06T 15/005* (2013.01)

(58) Field of Classification Search
CPC ..... G06T 15/005; G06T 15/405; G06T 15/40; G06T 17/005; G06T 1/60; G09G 2360/122; G06F 12/0811
See application file for complete search history.

(56) References Cited

U.S. PATENT DOCUMENTS

| | | | |
|---|---|---|---|
| 6,246,415 B1 | 6/2001 | Grossman et al. | |
| 6,480,205 B1 | 11/2002 | Greene et al. | |
| 7,450,120 B1 | 11/2008 | Hakura et al. | |
| 7,538,765 B2 | 5/2009 | Seiler et al. | |
| 7,755,624 B1 | 7/2010 | Hakura et al. | |
| 2002/0171651 A1 | 11/2002 | Kurihara et al. | |
| 2005/0122338 A1* | 6/2005 | Hong et al. | 345/546 |
| 2006/0209065 A1* | 9/2006 | Lapidous et al. | 345/422 |
| 2011/0148919 A1 | 6/2011 | Heggelund et al. | |
| 2012/0299910 A1 | 11/2012 | Liang | |
| 2013/0265305 A1* | 10/2013 | Hasselgren et al. | 345/422 |

OTHER PUBLICATIONS

International Search Report and Written Opinion from International Application No. PCT/US2014/059717, dated Apr. 24, 2015, 10 pp.

* cited by examiner

*Primary Examiner* — Haixia Du
(74) *Attorney, Agent, or Firm* — Shumaker & Sieffert, P.A.

(57) ABSTRACT

This disclosure describes techniques for performing hierarchical z-culling in a graphics processing system. In some examples, the techniques for performing hierarchical z-culling may involve selectively merging partially-covered source tiles for a tile location into a fully-covered merged source tile based on whether conservative farthest z-values for the partially-covered source tiles are nearer than a culling z-value for the tile location, and using a conservative farthest z-value associated with the fully-covered merged source tile to update the culling z-value for the tile location. In further examples, the techniques for performing hierarchical z-culling may use a cache unit that is not associated with an underlying memory to store conservative farthest z-values and coverage masks for merged source tiles. The capacity of the cache unit may be smaller than the size of cache needed to store merged source tile data for all of the tile locations in a render target.

26 Claims, 6 Drawing Sheets

SELECTIVELY MERGING PARTIALLY-COVERED TILES TO PERFORM HIERARCHICAL Z-CULLING

TECHNICAL FIELD

This disclosure relates to graphics processing systems, and more particularly, to z-culling techniques for use in graphics processing systems.

BACKGROUND

A graphics processing unit (GPU) may be used by various types of computing devices to accelerate the rendering of graphics data for display. Such computing devices may include, e.g., computer workstations, mobile phones (e.g., smartphones), embedded systems, personal computers, tablet computers, and video game consoles.

Rendering generally refers to the process of converting a three-dimensional (3D) graphics scene, which may include one or more 3D graphics objects, into two-dimensional (2D) rasterized image data. To render 3D graphics objects, a GPU may rasterize one or more primitives that correspond to each of the 3D graphics objects in order to generate a plurality of pixels that correspond to each of the 3D graphics objects. The pixels may be subsequently processed using various pixel processing operations to generate a resulting image. Pixel processing operations may include pixel shading operations, blending operations, texture-mapping operations, programmable pixel shader operations, etc.

As GPUs have become faster and faster, the complexity of graphics scenes that are rendered by GPUs has increased. Highly complex scenes may include a large number of 3D objects, each of which may correspond to hundreds or thousands of pixels. Processing each of these pixels may consume a significant amount of processing cycles and a relatively large amount of memory bandwidth.

3D graphics objects are typically subdivided into one or more graphics primitives (e.g., points, lines, triangles) prior to rasterization. Oftentimes, some of primitives may block or occlude other primitives from the perspective of the viewport such that the occluded primitives may not be visible in the resulting rendered image. Performing pixel processing operations for the pixels of occluded primitives may result in performing unnecessary pixel operations, which may consume unnecessary processing cycles and memory bandwidth in a graphics processing system.

Various solutions have been proposed to deal with the problem of unnecessary processing of pixels that are associated with occluded primitives. One solution is to perform hierarchical z-culling, which may involve discarding source pixels that are not visible in a final, resulting rendered image at a relatively early stage in the graphics pipeline in order to reduce the workload of the GPU and/or to reduce the memory bandwidth usage of the GPU. For example, a hierarchical z-culling algorithm may compare a conservative minimum z-value of an incoming source tile of pixels with a conservative maximum z-value for a destination tile of pixels that has the same tile location as the source tile, and discard the source tile of pixels when the conservative minimum z-value of the source tile is greater than the conservative maximum z-value for the tile location. A conservative maximum z-value for a destination tile of pixels may be a value that is greater than or equal to the actual maximum z-value for the destination tile of pixels.

Generally, the closer the conservative maximum z-value is to the actual maximum z-value of the destination tile (i.e., a value equal to the maximum z-value for all pixels in the destination tile), the greater the number of non-visible source pixels that may be discarded early in the graphics pipeline, and hence the greater the performance benefits that may be obtained by performing hierarchical z-culling. However, achieving conservative maximum z-values that are relatively close to the actual maximum z-values of a destination tile may be costly in terms of algorithm complexity, memory usage, memory bandwidth, and processor workload.

SUMMARY

This disclosure describes techniques for performing hierarchical z-culling in a graphics processing system. In some examples, the techniques for performing hierarchical z-culling may involve selectively merging partially-covered source tiles associated with a tile location into a fully-covered merged source tile based on whether conservative farthest z-values for the partially-covered source tiles are nearer than a culling z-value for the tile location, and using a conservative farthest z-value associated with the fully-covered merged source tile to update the culling z-value for the tile location. The culling z-value may be used to make a culling determination for the tile location, and may be indicative of a conservative farthest z-value for all samples of a destination tile corresponding to the tile location. The merging of partially-covered source tiles may be selective in the sense that partially-covered source tiles for a tile location that have conservative farthest z-values which are closer to the viewport than the culling z-value for the tile location may be merged while other partially-covered source tiles for the tile location may not be merged. Selectively merging source tiles in this manner may improve the quality of culling z-values that are used to perform hierarchical z-culling, which may improve the rejection efficiency of the z-culling algorithm. In this way, the performance and/or memory bandwidth usage of a graphics processor that performs hierarchical z-culling may be improved.

In one example, this disclosure describes a method that includes selectively merging, with a graphics processing unit (GPU), a source tile of samples associated with a tile location with a merged source tile for the tile location to generate an updated version of the merged source tile based on whether the source tile is fully covered by a primitive that corresponds to the source tile and based on whether a conservative farthest z-value of the source tile is nearer than a culling z-value associated with the tile location. The culling z-value is indicative of a conservative farthest z-value for all samples of a destination tile that corresponds to the tile location.

In another example, this disclosure describes a device that includes a graphics processing unit (GPU) configured to selectively merge a source tile of samples associated with a tile location with a merged source tile for the tile location to generate an updated version of the merged source tile based on whether the source tile is fully covered by a primitive that corresponds to the source tile and based on whether a conservative farthest z-value of the source tile is nearer than a culling z-value associated with the tile location. The culling z-value is indicative of a conservative farthest z-value for all samples of a destination tile that corresponds to the tile location.

In another example, this disclosure describes an apparatus that includes means for determining whether a conservative farthest z-value of a source tile of samples associated with a tile location is nearer than a culling z-value associated with the tile location. The culling z-value is indicative of a conservative farthest z-value for all samples of a destination tile that corresponds to the tile location. The apparatus further includes means for selectively merging the source tile with a merged source tile for the tile location to generate an updated version of the merged source tile based on whether the source tile is fully covered by a primitive that corresponds to the source tile and based on whether the conservative farthest z-value of the source tile is nearer than the culling z-value associated with the tile location.

In another example, this disclosure describes a computer-readable storage medium storing instructions that, when executed, cause one or more processors to selectively merge a source tile of samples associated with a tile location with a merged source tile for the tile location to generate an updated version of the merged source tile based on whether the source tile is fully covered by a primitive that corresponds to the source tile and based on whether a conservative farthest z-value of the source tile is nearer than a culling z-value associated with the tile location. The culling z-value is indicative of a conservative farthest z-value for all samples of a destination tile that corresponds to the tile location.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
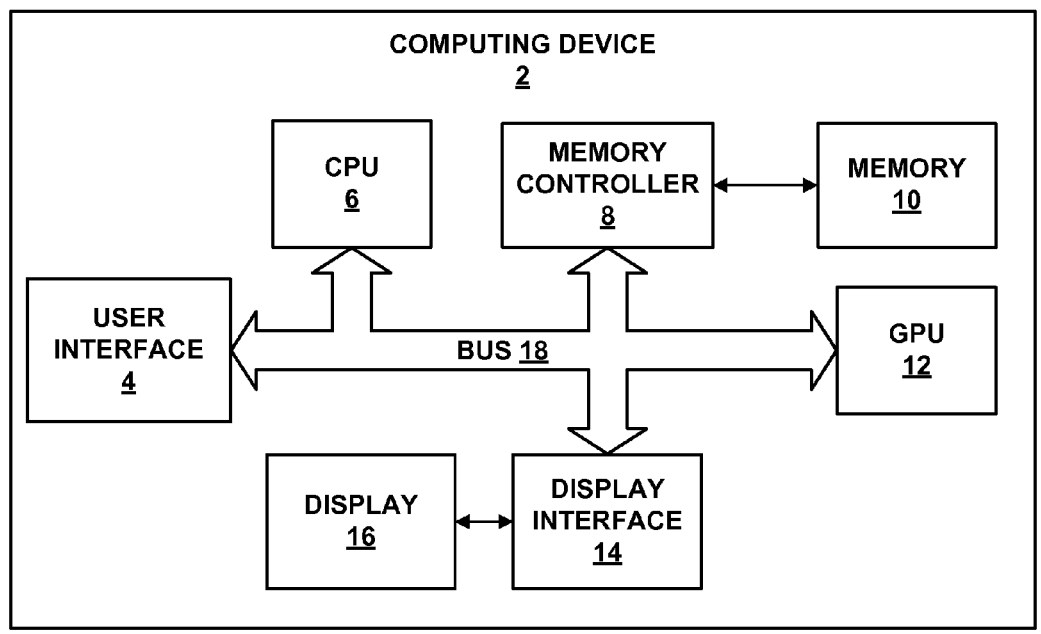
FIG. 1 is a block diagram illustrating an example computing device that may be used to implement the hierarchical z-culling techniques of this disclosure.

This disclosure describes techniques for performing hierarchical z-culling in a graphics processing system. In some examples, the techniques for performing hierarchical z-culling may involve selectively merging partially-covered source tiles associated with a tile location into a fully-covered merged source tile based on whether conservative farthest z-values for the partially-covered source tiles are nearer than a culling z-value for the tile location, and using a conservative farthest z-value associated with the fully-covered merged source tile to update the culling z-value for the tile location. The culling z-value may be used to make a culling determination for the tile location, and may be indicative of a conservative farthest z-value for all samples of a destination tile corresponding to the tile location. The merging of partially-covered source tiles may be selective in the sense that partially-covered source tiles for a tile location that have conservative farthest z-values which are closer to the viewport than the culling z-value for the tile location may be merged while other partially-covered source tiles for the tile location may not be merged. Selectively merging source tiles in this manner may improve the quality of culling z-values that are used to perform hierarchical z-culling, which may improve the rejection efficiency of the z-culling algorithm. In this way, the performance of and/or memory bandwidth usage of a graphics processor that performs hierarchical z-culling may be improved.

In further examples, the techniques for performing hierarchical z-culling may use a cache unit to store accumulated conservative farthest z-values and accumulated coverage masks for merged source tiles. The capacity of the cache unit may be smaller than the size of cache needed to store accumulated conservative farthest z-values and accumulated coverage masks for all of the tile locations in a render target. In addition, the cache unit may not be associated with an underlying memory. That is, the cache unit may act as the primary data store for merged source tile data rather than merely as a cached data store for storing copies of data that are primarily stored in another underlying memory. Using a cache configured in the above-described manner to store accumulated conservative farthest z-values and accumulated coverage masks may improve the performance of, the memory bandwidth usage of, and/or the memory footprint of a GPU that performs hierarchical z-culling based on accumulated conservative farthest z-values that are associated with merged source tiles.

In additional examples, the techniques for performing hierarchical z-culling may invalidate a cache line of a cache unit that stores merged source tile data for a tile location when the culling z-value for the tile location is being updated in response to processing a fully-covered, non-merged source tile for the tile location. For example, the techniques for performing hierarchical z-culling may invalidate a cache line associated with a tile location in response to determining that a source tile for the tile location is fully covered by a primitive that corresponds to the source tile and that the conservative farthest z-value of the source tile is nearer than the culling z-value associated with the tile location. After the culling z-value has been updated in response to processing a fully-covered, non-merged source tile for a tile location, the merged source tile corresponding to the tile location may, in some cases, have a conservative farthest z-value that is farther than the updated culling z-value. If the culling z-value were updated to equal a conservative farthest z-value that is farther than the culling z-value that is already being used, then the amount of samples that are culled may be reduced, thereby reducing the efficiency of the hierarchical z-culling algorithm. Invalidating the cache line that stores the merged source tile data for such a tile location may ensure that the conservative farthest z-value stored in the merge cache is not subsequently used for updating the culling z-value. Clearing out the merge cache in this manner may improve the quality of the resulting culling z-values, thereby improving the discard efficiency of the hierarchical z-culling algorithm.

Hierarchical z-culling may be used by GPUs to discard source samples that are not visible in a final, resulting rendered image at a relatively early stage in the graphics pipeline in order to reduce the workload of the GPU and/or to reduce the memory bandwidth usage of the GPU. Hierarchical z-culling may, in some examples, use culling z-values for each of the tile locations in a render target to determine source samples that are not visible and can therefore be discarded. A culling z-value may be indicative of a conservative farthest z-value for all samples of a destination tile corresponding to the tile location. A conservative farthest z-value for a destination tile may be a z-value that is at least as far as or farther than the farthest z-value in the destination tile of samples. A z-value for an individual sample in a tile may refer to a value indicative of the distance between the sample and a plane that is perpendicular to the direction of the camera (e.g., the viewport) associated with a rendered graphics frame that includes the sample. A sample may refer to a pixel or a sub-sample of a pixel.

One type of hierarchical z-culling algorithm may compare a conservative nearest z-value of an incoming source tile of samples with a culling z-value of a destination tile of samples, and discard the source tile of samples when the conservative nearest z-value of the source tile is farther than the culling z-value of the destination tile. This type of hierarchical z-culling technique uses a tile-wide culling z-value that indicates a conservative farthest z-value for all samples in a destination tile regardless of whether or not the samples in the destination tile are covered by a primitive. For example, when the culling z-value is initialized for the destination tile prior to rendering any primitives to the destination tile, the culling z-value may be set to a farthest possible z-culling value for the system. The culling z-value may remain at the farthest possible z-culling value as long as there is at least one sample in the destination tile that is not covered by a primitive. Using a tile-wide culling z-value that indicates a conservative farthest z-value for all samples in a destination tile regardless of whether or not the samples are covered by a primitive, as opposed to using a culling z-value that indicates a conservative farthest z-value for only those samples in a destination tile that are covered by primitives, may reduce the complexity of the discard comparisons that are performed during hierarchical z-culling, thereby improving the performance of a graphics system that implements hierarchical z-culling techniques.

For hierarchical z-culling algorithms that use a culling z-value that does not discriminate between covered and uncovered samples as discussed above, the culling z-value for the destination tile may be updated with a conservative farthest z-value for an incoming source tile if the conservative farthest z-value for the incoming source tile is nearer than the culling z-value for the destination tile and the incoming source tile is fully covered by a primitive that corresponds to the incoming source tile. However, the culling z-value may not always be able to be updated in a similar fashion if the incoming source tile is only partially, but not fully, covered by a primitive that corresponds to the source tile because it is uncertain whether using the conservative farthest z-value for the partially-covered source tile will result in a conservative farthest z-value for the entire destination tile. This may result in a less-than-optimal conservative farthest z-value for the destination tile, which may reduce the number of samples that can be discarded early in the graphics pipeline.

One technique for allowing partially-covered tiles to influence the updating of the conservative farthest z-value for a destination tile is to merge partially-covered source tiles that have a same tile location into fully-covered tiles, and to use an accumulated conservative farthest z-value associated with the merged fully-covered tiles to update the culling z-value for a destination tile at the same tile location. Using an accumulated conservative farthest z-value associated with merged source tiles to update the conservative farthest z-value for a destination tile may reduce the difference between the conservative farthest z-value and the actual farthest z-value for the destination tile, thereby allowing additional source samples to be discarded. In this way, the performance of a GPU that performs hierarchical z-culling may be improved.

One approach for merging partially-covered source tiles involves merging all partially-covered source tiles for a particular tile location regardless of whether or not the conservative farthest z-values of the source tiles to be merged are greater or less than the conservative farthest z-value of the destination tile. Such an approach may result in a merged source tile for a tile location that has a conservative farthest z-value that is farther from the viewport than the culling z-value for the tile location. A conservative farthest z-value for a merged source tile may be a z-value that is at least as far as or farther than the farthest z-value for all covered samples of the merged source tile. Replacing the culling z-value with a conservative farthest z-value that is farther from the viewport than the culling z-value may reduce the amount of samples that are discarded by the hierarchical z-culling algorithm, thereby reducing the performance benefits obtained by performing hierarchical z-culling.

For merged source tiles where the conservative farthest z-value for the merged source tile is farther from the viewport than the corresponding culling z-value for the tile location, some of the partially-covered source tiles that were used to form the merged source tile may include conservative farthest z-values that are closer to the viewport than culling z-value. A system that indiscriminately merges partially-covered source tiles with each other regardless of the orientation of the conservative farthest z-values for such source tiles relative to the culling z-value may prevent partially-covered source tiles that are nearer to the viewport than the culling z-value from positively influencing the quality of the culling z-value, thereby potentially reducing the amount of samples that are discarded by the hierarchical z-culling algorithm.

According to some aspects of this disclosure, techniques are described for selectively merging partially-covered source tiles associated with a tile location into a fully-covered merged source tile for the tile location based on whether conservative farthest z-values for the partially-covered source tiles are nearer than a culling z-value for the tile location. The merging of partially-covered source tiles may be selective in the sense that partially-covered source tiles for a tile location that have conservative farthest z-values which are nearer than the culling z-value for the tile location may be merged while other partially-covered source tiles for the tile location may not be merged. Selectively merging source tiles in this manner may improve the quality of culling z-values that are used to perform z-culling, which may improve the discard rate of the z-culling algorithm. In this way, the performance of and/or memory bandwidth usage of a graphics processor that performs hierarchical z-culling may be improved.

The process of updating the conservative farthest z-value for destination tiles according to the above-mentioned approach will now be described. When a fully-covered incoming source tile is processed and the conservative farthest z-value of the incoming source tile is nearer than the conservative farthest z-value of the destination tile that has the same tile location as the incoming source tile, then the conservative farthest z-value for the destination tile is updated with the conservative farthest z-value of the incoming source tile. If the conservative farthest z-value of the fully-covered incoming source tile is not nearer than the conservative farthest z-value of the destination tile, then the conservative farthest z-value for the destination tile is not updated.

When a partially-covered incoming source tile is processed, the conservative farthest z-value for the incoming source tile may be compared to the culling z-value. If the conservative farthest z-value for the incoming source tile is not nearer to the viewport than the culling z-value, then the partially-covered source tile may not be merged. On the other hand, if the conservative farthest z-value for the incoming source tile is nearer to the viewport than the culling z-value, then the partially-covered incoming tile may be merged with any partially-covered incoming source tiles that have been previously merged for the same tile location.

If the merge operation results in a fully-covered merged tile, then the culling z-value for the tile location is updated with the farthest z-value of the fully-covered merged tile. Otherwise, if the merge operation does not result in a fully-covered tile, then the conservative farthest z-value for the destination tile is not updated, but data defining the merged source tile may be stored for use in later merging operations.

One approach for storing data that defines a merged source tile is to allocate a memory entry in a memory for each of the tile locations of a render target, and to store an accumulated coverage mask and an accumulated conservative farthest z-value for a respective one of the tile locations in each of the memory entries. The accumulated coverage mask for a particular tile location may correspond to a merged version of the coverage masks for each of the partially-covered source tiles that have been merged for that particular tile location. A coverage mask for a source tile may include a bit for each of the samples in the source tile where each of the bits indicates whether a primitive that corresponds to the source tile covers a sample that corresponds to the respective bit. A primitive may correspond to a source tile of samples if the source tile of samples was generated in response to rasterizing the primitive. A merged version of a plurality of coverage masks may correspond to the result of a bit-wise OR operation performed with respect to all of the plurality of coverage masks. The accumulated conservative farthest z-value for a particular tile location may correspond to the farthest of the conservative farthest z-values for each of the partially-covered incoming tiles that have been merged for that particular tile location.

After merging a partially-covered source tile with partially-covered source tiles that have been previously merged for the same tile location, the accumulated coverage mask may be examined to determine whether the merged source tile is a fully-covered merged source tile or a partially-covered merged source tile. For a fully-covered merged source tile, the coverage mask may have all of the bits set to indicate that each of the samples in the merged source tile is covered by at least one primitive that will be displayed on the render target. For a partially-covered merged source tile, the coverage mask may have some bits that are set and some bits that are not set indicating that some of the samples of the merged source tile are not covered by a primitive.

A render target may include a large number of different tile locations that are used for performing hierarchical z-culling. Storing accumulated coverage masks and accumulated farthest z-values for each of the different tile locations may consume a significant amount of memory. Moreover, accessing accumulated coverage masks and accumulated farthest z-values for each of the different tile locations may consume a significant amount of memory bandwidth. In addition, the amount of memory needed to store merged source tile data may require the memory to be implemented on a different chip (i.e., off-chip) from the GPU that accesses the data. The large number of off-chip memory accesses performed by the GPU when accessing such data may cause a significant amount of processing delay.

According to some aspects of this disclosure, a memory unit may be used to store accumulated coverage masks and accumulated farthest z-values that may be used to merge partially-covered source tiles when performing hierarchical z-culling. The size of the memory unit may be smaller than the size of memory needed to store accumulated coverage masks and accumulated farthest z-values for all of the tile locations in a render target. This may reduce the memory footprint needed to store accumulated coverage masks and accumulated farthest z-values. A relatively small-sized memory unit may also allow the memory unit to be implemented on the same chip as the GPU, thereby reducing the amount of off-chip memory bandwidth needed to access the data. In addition, allowing the memory to be implemented on the same chip as the GPU may reduce the amount of delay needed to access the data, thereby improving the performance of hierarchical z-culling operations.

Because the memory unit that is used to store the accumulated coverage masks and the accumulated farthest z-values may be smaller than the size of memory needed to store accumulated coverage masks and accumulated farthest z-values for all of the tile locations in a render target, it is possible that data for two different tile locations may overwrite each other in cases where the two different tile locations map to the same memory entry. Although this may reduce the quality of the conservative farthest z-values (i.e., how close the conservative farthest z-values are to the actual farthest z-values), the performance benefits achieved by using an on-chip memory may, in some cases, outweigh any decrease in performance due to data overwrites.

In some examples, the memory unit may be a cache unit. The size of the cache unit may be smaller than the size of cache needed to store accumulated coverage masks and accumulated farthest z-values for all of the tile locations in a render target. In addition, the cache unit may not be associated with an underlying memory. That is, the cache unit may act as the primary data store for merged source tile data rather than merely as a cached data store for storing copies of data that are primarily stored elsewhere. Cache units are typically designed to store a smaller amount of data than the underlying memory space for which such cache units provide caching services. Thus, cache units often implement various mapping policies (e.g., direct mapped, set-associative, fully-associative, etc.) and replacement policies (e.g., least recently used, least frequently used, random, etc.) to determine where data will be stored in the cache and which data will be overwritten in the cache. Using a cache unit as the primary storage unit for storing merged source tile data may allow a graphics system to leverage these built-in mechanisms for determining where data is stored in a cache unit and which data is overwritten in a cache unit even if the cache unit does not keep an extra copy in the underlying memory. This may simplify the design of and/or reduce the amount of area needed to implement a memory unit for storing merged source tile data.

When the memory that is used for storing merge source tile data is implemented as a cache unit, the cache unit may include a plurality of different cache lines where each of the cache lines stores data for a respective one of the tile locations of the render target. For example, each of the cache lines may be configured to store a tag, an accumulated coverage mask for a tile location, and an accumulated conservative farthest z-value for the tile location. The tile location (e.g., the tile's screen coordinates) that corresponds to the data stored in a particular cache line may be used as the tag for that cache line.

When a partially-covered incoming source tile is processed, the cache may be accessed to see if there is a cache line that contains data associated with the tile location of the partially-covered incoming source tile. If one of the cache lines does contain data associated with the tile location of the partially-covered incoming source tile, then the coverage mask and the conservative farthest z-value for the incoming source tile are merged with the accumulated coverage mask and accumulated conservative farthest z-value contained in the cache. Otherwise, a new cache entry is generated for the tile location and the accumulated coverage mask and the accumulated conservative farthest z-value are set equal to, respectively, the coverage mask and the conservative farthest z-value of the incoming source tile. If the performance of the merge operation results in a fully-covered merged tile, then the cache line associated with the fully-covered merged tile may be invalidated.

As discussed above, when a fully-covered incoming source tile is processed and the conservative farthest z-value of the incoming source tile is nearer than the conservative farthest z-value of the destination tile that has the same tile location as the incoming source tile, then the conservative farthest z-value for the destination tile is updated with the conservative farthest z-value of the incoming source tile. In some cases, when the fully-covered incoming source tile is being processed, one or more partially-covered source tiles may have already been merged and the data associated with the merged source tile may be stored in a merge cache unit.

One approach for dealing with the merged source tile is to keep the tile in the merge cache and keep merging partially-covered source tiles with the merged source tile until the merged source tile is fully covered. However, this approach may not guarantee that the conservative farthest z-value for the resulting fully-covered merged source tile is nearer than the culling z-value that is already in use. If the culling z-value were replaced by a conservative farthest z-value that is not nearer than the culling z-value already in use, then the amount of samples that are discarded by the hierarchical z-culling algorithm may be reduced, thereby decreasing the efficiency of the algorithm.

According to some aspects of this disclosure, a cache line of a cache unit that stores merged source tile data for a tile location may be invalidated when the culling z-value for the tile location is being updated in response to processing a fully-covered, non-merged source tile for the tile location. For example, a cache line associated with a tile location may be invalidated in response to determining that a source tile for the tile location is fully covered by the primitive that corresponds to the source tile and that the conservative farthest z-value of the source tile is nearer than the culling z-value associated with the tile location. Invalidating cache lines in this manner may prevent the culling z-value from being replaced by a conservative farthest z-value that is not nearer than the culling z-value already in use. In this way, the quality of the resulting culling z-values may be improved, thereby improving the discard efficiency of the hierarchical z-culling algorithm.

FIG. 1 is a block diagram illustrating an example computing device 2 that may be used to implement the hierarchical z-culling techniques of this disclosure. Computing device 2 may be, for example, a personal computer, a desktop computer, a laptop computer, a computer workstation, a video game platform or console, a wireless communication device (such as, e.g., a mobile telephone, a cellular telephone, a satellite telephone, and/or a mobile phone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user interface 4, a CPU 6, a memory controller 8, a memory 10, a graphics processing unit (GPU) 12, a display interface 14, a display 16 and a bus 18. User interface 4, CPU 6, memory controller 8, GPU 12 and display interface 14 may communicate with each other using bus 18. It should be noted that the specific components included in computing device 2 of FIG. 1 and the configuration of the components shown in FIG. 1 are merely exemplary, and other types of computing devices and/or other graphics processing systems with the same or different components in the same or different configurations may be used to implement the techniques of this disclosure.

CPU 6 may be a general-purpose or a special-purpose processor that controls the operation of computing device 2. A user may provide input to computing device 2 to cause CPU 6 to execute one or more software applications. The software applications that execute on CPU 6 may include, for example, a graphics application, a word processor application, an email application, a spread sheet application, a media player application, a video game application, a graphical user interface application, an operating system, or any type of program that uses GPU 12 for rendering graphics images. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct GPU 12 to render graphics data to a frame buffer for display on display 16. In some examples, the graphics rendering instructions may conform to a graphics application programming interface (API), such as, e.g., a DirectX API, a Direct3D API, an Open Graphics Library (OpenGL®) API, an Open Graphics Library Embedded Systems (OpenGL ES) API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to render some or all of the graphics data. In some examples, the graphics data to be rendered may include a list of graphics primitives, e.g., points, lines, triangles, quadrilaterals, triangle strips, etc.

Memory controller 8 facilitates the transfer of data going into and out of memory 10. For example, memory controller 8 may receive memory read and write commands, and service such commands with respect to memory 10 in order to provide memory services for the components in computing device 2. Memory controller 8 is communicatively coupled to memory 10. Although memory controller 8 is illustrated in the example computing device 2 of FIG. 1 as being a processing module that is separate from both CPU 6 and memory 10, in other examples, some or all of the functionality of memory controller 8 may be implemented on one or both of CPU 6 and memory 10.

Memory 10 may store program modules and/or instructions that are accessible for execution by CPU 6 and/or data for use by the programs executing on CPU 6. For example, memory 10 may store program code and graphics data associated with the applications executing on CPU 6. Memory 10 may additionally store information for use by and/or generated by other components of computing device 2. For example, memory 10 may act as a device memory for GPU 12 and may store data to be operated on by GPU 12 as well as data resulting from operations performed by GPU 12. For example, memory 10 may store any combination of vertex buffers, texture buffers, depth buffers, stencil buffers, frame buffers, render targets, or the like. In addition, memory 10 may store command streams for processing by GPU 12. Memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data medium or an optical storage medium.

GPU 12 may be configured to execute commands that are issued to GPU 12 by CPU 6. The commands executed by GPU 12 may include graphics commands, draw call commands, GPU state programming commands, memory transfer commands, general-purpose computing commands, kernel execution commands, etc.

GPU 12 may be configured to perform graphics operations to render one or more graphics primitives to display 16. In such examples, when one of the software applications executing on CPU 6 requires graphics processing, CPU 6 may provide graphics data to GPU 12 and issue one or more graphics commands to GPU 12. The graphics commands may include, e.g., draw call commands, GPU state programming commands, memory transfer commands, blitting commands, etc. The graphics data may include vertex buffers, texture data, surface data, etc. In some examples, CPU 6 may provide the commands and graphics data to GPU 12 by writing the commands and graphics data to memory 10, which may be accessed by GPU 12.

GPU 12 may, in some instances, be built with a highly-parallel structure that provides more efficient processing of vector operations than CPU 6. For example, GPU 12 may include a plurality of processing elements that are configured to operate on multiple vertices, control points, pixels and/or other data in a parallel manner. The highly parallel nature of GPU 12 may, in some instances, allow GPU 12 to render graphics images (e.g., GUIs and two-dimensional (2D) and/or three-dimensional (3D) graphics scenes) onto display 16 more quickly than rendering the images using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 12 may include a GPU cache, which may provide caching services for all or a portion of memory 10. In such examples, GPU 12 may use the cache to process data locally using a local storage, instead of off-chip memory. This allows GPU 12 to operate in a more efficient manner by reducing the need for GPU 12 to access memory 10 via bus 18, which may experience heavy bus traffic. In some examples, however, GPU 12 may not include a separate cache, but instead utilize memory 10 via bus 18. The GPU cache may include one or more volatile or non-volatile memories or storage devices, such as, e.g., random access memory (RAM), static RAM (SRAM), dynamic RAM (DRAM), etc.

CPU 6 and/or GPU 12 may store rasterized image data in a frame buffer that is allocated within memory 10. Display interface 14 may retrieve the data from the frame buffer and configure display 16 to display the image represented by the rasterized image data. In some examples, display interface 14 may include a digital-to-analog converter (DAC) that is configured to convert the digital values retrieved from the frame buffer into an analog signal consumable by display 16. In other examples, display interface 14 may pass the digital values directly to display 16 for processing.

Display 16 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 16 may be integrated within computing device 2. For instance, display 16 may be a screen of a mobile telephone handset or a tablet computer. Alternatively, display 16 may be a stand-alone device coupled to computing device 2 via a wired or wireless communications link. For instance, display 16 may be a computer monitor or flat panel display connected to a personal computer via a cable or wireless link.

Bus 18 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 18 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

According to this disclosure, GPU 12 may be configured to perform any of the hierarchical z-culling techniques described in this disclosure. For example, GPU 12 may be configured to selectively merge partially-covered source tiles of samples that are associated with a tile location based on whether conservative farthest z-values for the partially-covered source tiles are nearer than a culling z-value for the tile location. Selectively merging source tiles in this manner may improve the quality of culling z-values that are used to perform z-culling, which may improve the discard rate of the z-culling algorithm. In this way, the performance of and/or memory bandwidth usage of a graphics processor that performs hierarchical z-culling may be improved.

As another example, GPU 12 may use a memory unit to store accumulated coverage masks and accumulated farthest z-values that define merged source tiles. The merged source tiles may be used to update culling z-values that are used to perform hierarchical z-culling. The memory unit may be formed on the same chip as GPU 12 or on another chip (e.g., memory 10). The size of the memory unit may be smaller than the size of memory needed to store accumulated coverage masks and accumulated farthest z-values for all of the tile locations in a render target. This may reduce the memory footprint needed to store accumulated coverage masks and accumulated farthest z-values. A relatively small-sized memory unit may also allow the memory unit to be implemented on the same chip as GPU 12, thereby reducing the amount of off-chip memory bandwidth needed to access the data. In addition, allowing the memory to be implemented on the same chip as GPU 12 may reduce the amount of execution delay needed to access the data, thereby improving the performance of hierarchical z-culling operations.

Because the memory unit that is used to store the accumulated coverage masks and the accumulated farthest z-values may be smaller than the size of memory needed to store accumulated coverage masks and accumulated farthest z-values for all of the tile locations in a render target, it is possible that data for two different tile locations may overwrite each other in cases where the two different tile locations map to the same memory entry. Although this may reduce the quality of the conservative farthest z-values (i.e., how close the conservative farthest z-values are to the actual farthest z-values), the performance benefits achieved by using an on-chip memory may, in some cases, outweigh any decrease in performance due to data overwrites.

In some examples, the memory unit may be a cache unit. The size of the cache unit may be smaller than the size of cache needed to store accumulated coverage masks and accumulated farthest z-values for all of the tile locations in a render target. In addition, the cache unit may not be associated with an underlying memory. That is, the cache unit may act as the primary data store for merged source tile data rather than merely as a cached data store for storing copies of data that are primarily stored elsewhere. Cache units are typically designed to store a smaller amount of data than the underlying memory space for which such cache units provide caching services. Thus, cache units often implement various mapping policies (e.g., direct mapped, set-associative, fully-associative, etc.) and replacement policies (e.g., least recently used, least frequently used, random, etc.) to determine where data will be stored in the cache and which data will be overwritten in the cache. Using a cache unit as the primary storage unit for storing merged source tile data may allow a graphics system to leverage these built-in mechanisms for determining where data is stored in a cache unit and which data is overwritten in a cache unit even if the cache unit does not keep an extra copy in the underlying memory. This may simplify the design of and/or reduce the amount of area needed to implement a memory unit for storing merged source tile data.

As a further example of the hierarchical z-culling techniques that may be performed by GPU 12, when GPU 12 stores merged source tile data in a cache unit, GPU 12 may invalidate a cache line of the cache unit for a tile location when the culling z-value for the tile location is being updated in response to processing a fully-covered, non-merged source tile for the tile location. For example, GPU 12 may invalidate a cache line associated with a tile location in response to determining that a source tile for the tile location is fully covered by the primitive that corresponds to the source tile and that the conservative farthest z-value of the source tile is nearer than the culling z-value associated with the tile location. After the culling z-value has been updated in response to processing a fully-covered, non-merged source tile for a tile location, the merged source tile corresponding to the tile location may have a conservative farthest z-value that is farther than the updated culling z-value. If the culling z-value were updated to equal a conservative farthest z-value that is farther than the culling z-value that is already being used, then the amount of samples that are culled may be reduced, thereby reducing the efficiency of the hierarchical z-culling algorithm. Invalidating the cache line that stores the merged source tile data for such a tile location may ensure that the conservative farthest z-value stored in the merge cache is not subsequently used for updating the culling z-value. Clearing out the merge cache in this manner may improve the quality of the resulting culling z-values, thereby improving the discard efficiency of the hierarchical z-culling algorithm.

Figure 2:
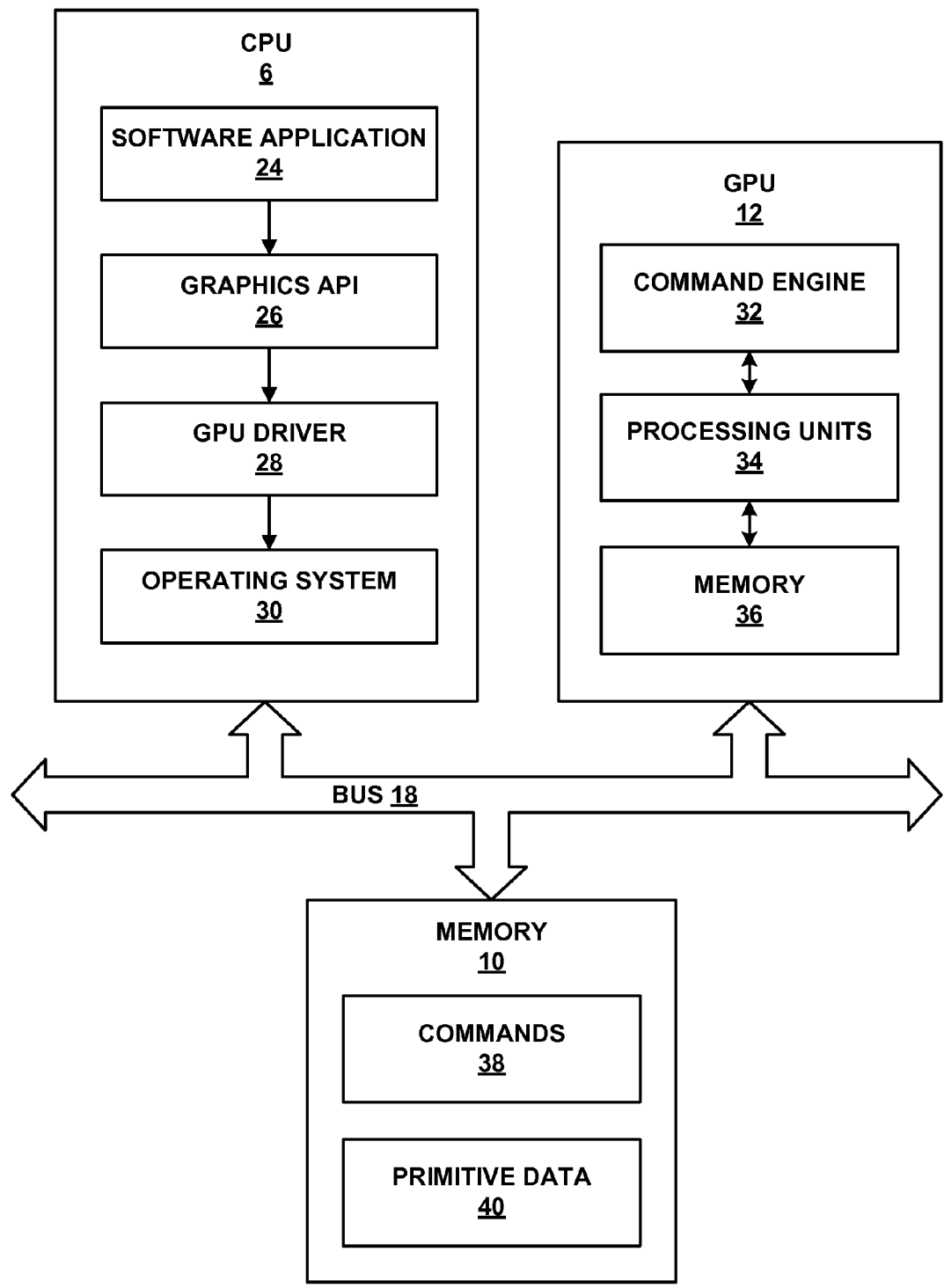
FIG. 2 is a block diagram illustrating the CPU, the GPU and the memory of the computing device shown in FIG. 1 in further detail.

FIG. 2 is a block diagram illustrating CPU 6, GPU 12 and memory 10 of computing device 2 in FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC).

CPU 6 may include one or more processors (e.g., microprocessors) that are configured to execute any of a software application 24, a graphics API 26, a GPU driver 28 and an operating system 30. In some examples, CPU 6 may be configured to execute instructions that cause the one or more processors of CPU 6 to perform all or part of any of the techniques described in this disclosure.

GPU 12 includes a command engine 32, one or more processing units 34, and a memory 36. The one or more processing units 34 may be configured to form a 3D graphics rendering pipeline. Command engine 32 and processing units 34 may include any combination of dedicated hardware units, firmware, software, and processors that are configured to perform the functions attributed to such components. In some examples, GPU 12 may be configured to execute instructions that cause one or more processors of GPU 12 to perform all or part of any of the techniques described in this disclosure.

Memory 10 may store one or more commands 38 and primitive data 40. In some examples, memory 10 may also store instructions that, when executed, cause one or more processors to perform all or part of any of the techniques described in this disclosure.

Software application 24 may be a graphics application that uses GPU 12 to render one or more 3D graphics scenes and/or 3D graphics objects into an image to be displayed on a display. Software application 24 may include instructions that cause GPU 12 to rasterize and render a set of 3D graphics primitives. Software application 24 may issue the instructions to GPU driver 28 via graphics API 26. Graphics API 26 may be a runtime service that translates the instructions received from software application 24 into a format that is consumable by GPU driver 28.

GPU driver 28 receives the instructions from software application 24, via graphics API 26, and controls the operation of GPU 12 to service the instructions. For example, GPU driver 28 may formulate one or more commands 38, place the commands 38 into memory 10, and instruct GPU 12 to execute the commands 38. In some examples, GPU driver 28 may place the commands 38 into memory 10 and communicate with GPU 12 via operating system 30, e.g., via one or more system calls.

Operating system 30 may provide a software platform upon which software application 24, graphics API 26, and GPU driver 28 execute. Operating system 30 may manage the hardware details of communicating and transferring data between CPU 6, memory 10 and GPU 12.

Commands 38 may include one or more state commands and one or more draw call commands. A state command may instruct GPU 12 to change one or more of the state variables in GPU 12, such as, e.g., the primitive type. A draw call command may instruct GPU 12 to render the geometry defined by a group of one or more vertices (e.g., defined in a vertex buffer) stored in memory 10. The geometry defined by the group of one or more vertices may, in some examples, correspond to a plurality of primitives to be rendered (e.g., primitive data 40). In general, a draw call command may invoke GPU 12 to render all of the vertices stored in a defined section (e.g., buffer) of memory 10. In other words, once the GPU 12 receives the draw call command, control is passed to GPU 12 for rendering the geometry and primitives represented by the vertices in the defined section (e.g., buffer) of memory 10.

Command engine 32 is configured to retrieve and execute commands 38 stored in memory 10. Command engine 32 may manage the rendering state of GPU 12, control the operation of processing units 34 such that processing units 34 implement a graphics rendering pipeline, and cause graphics data to be rendered into a render target via the graphics rendering pipeline.

In response to receiving a state command, command engine 32 may be configured to set one or more state registers in GPU to particular values based on the state command, and/or to configure one or more of the fixed-function processing units 34 based on the state command. In response to receiving a draw call command, command engine 32 may be configured to cause processing units 34 to render the geometry represented by vertices in memory 10 (e.g., the geometry represented by primitive data 40). Command engine 32 may also receive shader program binding commands, and load particular shader programs into one or more of the programmable processing units 34 based on the shader program binding commands.

Processing units 34 may include one or more processing units, each of which may be a programmable processing unit or a fixed-function processing unit. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., a High Level Shading Language (HLSL), an OpenGL Shading Language (GLSL), a C for Graphics (Cg) shading language, etc.

A programmable shader unit may, in some examples, include a plurality of processing units that are configured to operate in parallel, e.g., a single instruction multiple data (SIMD) pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader units, pixel shader units, geometry shader units, hull shader units, domain shader units, compute shader units, and/or unified shader units.

A fixed-function processing unit may include hardware that is hard-wired to perform certain functions. Although the fixed-function hardware may be configurable, via one or more control signals, for example, to perform different functions, the fixed-function hardware typically does not include a program memory that is capable of receiving user-compiled programs. In some examples, the fixed-function processing units in processing units 34 may include, for example, processing units that perform raster operations, such as, e.g., depth testing, scissors testing, alpha blending, etc.

Memory 36 may be configured to store merged source tile data that is used when performing hierarchical z-culling. The merged source tile data may include an accumulated conservative farthest z-value and/or an accumulated coverage mask for various tile locations in a render target. The accumulated coverage mask for a particular tile location may correspond to a merged version of the coverage masks for each of the partially-covered incoming tiles that have been merged for that particular tile location. A coverage mask for an incoming tile may include a bit for each sample in the incoming tile where each of the bits indicates whether a primitive that corresponds to the incoming tile covers a sample that corresponds to the respective bit. A primitive may correspond to an incoming tile of samples if the incoming tile of samples was generated in response to rasterizing the primitive. A merged version of a plurality of coverage masks may correspond to the result of a bit-wise OR operation performed with respect to all of the plurality of coverage masks. The accumulated conservative farthest z-value for a particular tile location may correspond to the largest of the farthest z-values for each of the partially-covered incoming tiles that have been merged for that particular tile location.

The accumulated conservative farthest z-value for a particular tile location may be alternatively referred to as the conservative farthest z-value for the particular tile location or as the conservative farthest z-value for a merged source tile that corresponds to the tile location. Similarly, the accumulated coverage mask for a particular tile location may be alternatively referred to as the coverage mask for the particular tile location or as the coverage mask for a merged source tile that corresponds to the tile location.

In some examples, memory 36 may be configured to store a plurality of merged source tile data records. Each of the merged source tile data records may include data associated with a merged source tile for a respective one of a plurality of tile locations of a render target. In other words, the merged source tile data associated with a particular tile location (i.e., associated with a particular merged source tile) may be referred to as a merged source tile data record for the tile location. In such examples, memory 36 may, in some examples, have a data capacity that is smaller than an amount of data required to store N merged source tile data records, where N is a total number of tile locations in the render target.

In some examples, the data associated with the merged source tile that is included in a data record for a tile location may include a conservative farthest z-value for the merged source tile associated with the tile location. In further examples, the data associated with the merged source tile that is included in a data record for a tile location may include a coverage mask for the merged source tile associated with the tile location. In additional examples, the data associated with the merged source tile that is included in a data record for a tile location may include both a conservative farthest z-value for the merged source tile associated with the tile location and a coverage mask for the merged source tile associated with the tile location.

Memory 36 may include one or more volatile or non-volatile memories or storage devices, such as, e.g., random access memory (RAM), static RAM (SRAM), dynamic RAM (DRAM), cache units etc. In some examples, memory 36 may be an on-chip memory. An on-chip buffer memory refer to a memory that is formed on, located on, and/or disposed on a microchip, an integrated circuit, and/or a die that is the same as the microchip, integrated circuit, and/or die upon which GPU 12 is formed, located, and/or disposed.

In further examples, memory 36 may be a cache unit (e.g., an on-chip cache unit). In such examples, the cache unit may not be associated with an underlying memory. The cache unit may not be associated with an underlying memory in the sense that the cache unit may service all read and write requests without accessing an underlying memory. Moreover, if there is not enough mapped memory space in the cache unit available to store incoming data associated with a merged source tile, the cache unit may overwrite data associated with another merged source tile with the incoming data. For example, memory 36 may be configured to write a first merged source tile data record associated with a first tile location to a cache line in the cache unit without writing the first merged source tile data record to an underlying memory, and to overwrite the first merged source tile data record with a second merged source tile data record associated with a second tile location without writing the first merged source tile data record to the underlying memory.

Memory 36 may act as the primary data store for merged source tile data rather than merely as a cached data store for storing copies of data that are primarily stored in another underlying memory. However, the primary data store is not guaranteed to retain the data in the data store because the cache unit may overwrite data without notice to the hierarchical z-culling algorithm that is accessing the cache.

Primitive data 40 may include data indicative of one or more primitives to be rendered. In some cases, primitive data 40 may geometrically define the primitives to be rendered. Geometrically defining a primitive may refer to defining a primitive by a set of vertices (or control points) and corresponding vertex attributes. In some examples, primitive data 40 may take the form of a plurality of vertices, a vertex list, and/or vertex buffer. In further examples, primitive data 40 may take the form a vertex buffer in combination with an index buffer. In such examples, the vertex buffer may define the vertices, and the index buffer may specify which vertices are used to define each of the primitives.

Each of vertices included in primitive data 40 may include one or more attributes, such as, e.g., positional coordinates, normal coordinates, texture coordinates, etc. The vertices may conceptually correspond to the vertices of a geometric primitive (e.g., a point, line, triangle, etc.) and/or to the control points of a higher-order primitive (e.g., a higher-order surface such as a Bézier surface). In some case, each of the vertices may be grouped into groups of one or more vertices, and each of these groups of vertices may correspond to a single primitive.

The shape of the geometrically-defined primitive may be defined, in some examples, by additional data that is not necessarily included in primitive data 40. The additional data may include one or more of a specified primitive type from a set of one or more predetermined primitive types, one or more mathematical functions, and/or one or more tessellation techniques.

In some examples, the specified primitive type may be stored as a rendering state variable in GPU 12 and may be configurable by software application 24. The specified primitive type may, in some cases, define the shape of the resulting rendered primitives (e.g., points, lines, triangles, etc.) and/or the connectivity of the vertices included in primitive data 40 (e.g., triangle strip, triangle fan, etc.). In some examples, the different primitive types may correspond to a set of primitive topologies that the graphics pipeline implemented by processing units 34 is capable of processing. In further examples, the different primitive types may correspond to the set of primitive topologies that are defined by graphics API 26 and are available for use by software application 24.

The one or more mathematical functions and/or the one or more tessellation techniques may be specified in one or more shader programs that are configured to execute on one or more shader units of GPU 12 (e.g., a hull shader unit and/or domain shader unit). The mathematical functions may be used to define primitives that have curved lines and/or curve surfaces. The one or more tessellation techniques may be used to define a primitive by a plurality of tessellated primitives that approximate the shape and/or curvature of an input primitive.

During operation, software application 24 (e.g., a graphics application) executing on CPU 6 may place primitive data 40 into memory 10, and issue one or more draw calls to GPU 12. Primitive data 40 may geometrically define one or more graphics primitives to be rendered. In response to receiving the one or more draw calls, command engine 32 causes a 3D graphics pipeline implemented by processing units 34 to render the primitives. The 3D graphics pipeline may include geometry processing stages that process the vertices of the primitives defined by primitive data 40, a rasterizer stage that generates one or more samples (e.g., pixels) that correspond to a rasterized version of the primitives, and one or more pixel processing stages that process the samples to generate a resulting rendered image for the primitives defined by primitive data 40.

According to this disclosure, the 3D graphics pipeline implemented by processing units 34 may include a hierarchical z-culling stage that performs any of the hierarchical z-culling techniques described in this disclosure. In some examples, the hierarchical z-culling stage may be positioned in the 3D graphics pipeline after the rasterizer and prior to one or more of the pixel processing stages. The hierarchical z-culling techniques described in this disclosure may, in some examples, improve the quality of z-culling values used to perform hierarchical z-culling, thereby improving the discard rate of hierarchical z-culling stage. Moreover, the hierarchical z-culling techniques described in this disclosure may, in some examples, be able to use a relatively small memory unit or cache unit to store merged source tile data compared to other systems, thereby reducing the memory footprint and/or memory bandwidth needed to achieve relatively high hierarchical z-culling discard rates. In this way, the techniques of this disclosure may be used to improve the performance of, memory bandwidth usage of, and/or memory footprint used by GPU 12.

Figure 3:
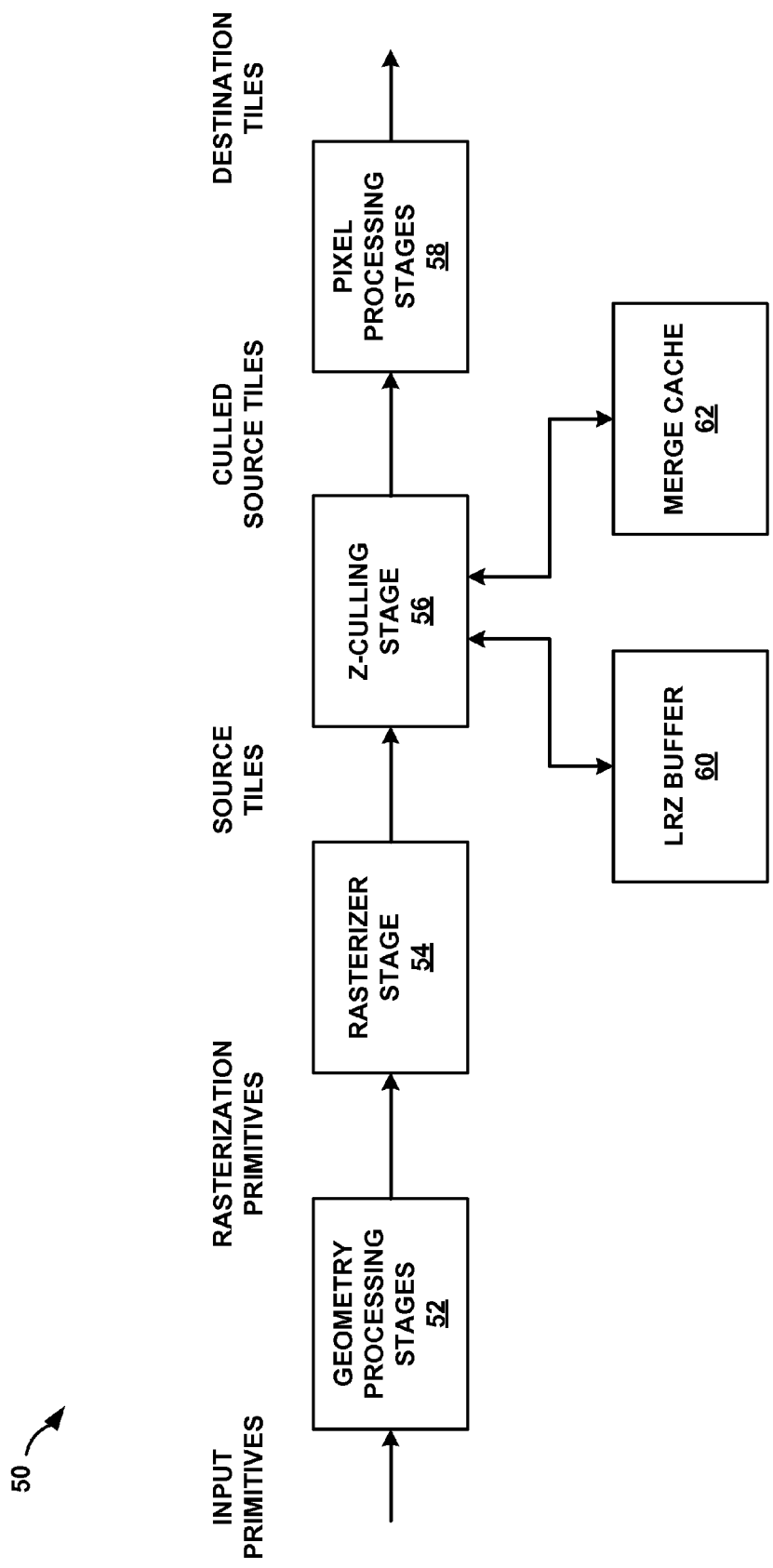
FIG. 3 is a block diagram illustrating an example graphics pipeline that may be used to implement the hierarchical z-culling techniques of this disclosure.

FIG. 3 is a block diagram illustrating an example graphics pipeline 50 that may be used to implement the hierarchical z-culling techniques of this disclosure. Graphics pipeline 50 includes one or more geometry processing stages 52, a rasterizer stage 54, a z-culling stage 56, one or more pixel processing stages 58, a low resolution z-buffer (LRZ buffer) 60, and a merge cache 62. In some examples, graphics pipeline 50 may be implemented in GPU 12 shown in FIG. 2. In such examples, geometry processing stages 52, rasterizer stage 54, z-culling stage 56, and pixel processing stages 58 may, in some examples, be implemented by one or more of processing units 34 of GPU 12. Also in such examples, LRZ buffer 60 may, in some examples, be implemented in memory 10 of computing device 2. Also in such examples, merge cache 62 may, in some examples, be implemented in memory 36 of GPU 12.

Geometry processing stages 52 are configured to receive input primitives, and to generate rasterization primitives based on the input primitives. To generate the rasterization primitives, geometry processing stages 52 may perform geometry processing operations based the input primitives. Geometry processing operations may include, for example, vertex shading, vertex transformations, lighting, hardware tessellation, hull shading, domain shading, geometry shading, etc.

Input primitives may refer to primitives that are capable of being processed by the geometry processing stages of a graphics rendering pipeline. In some examples, input primitives may be defined by a graphics API that is implemented by graphics pipeline 50. For example, input primitives may correspond to the input primitive topologies in the Microsoft DirectX 11 API. Input primitives may include points, lines, line lists, triangles, triangle strips, patches etc. In some examples, the input primitives may correspond to a plurality of vertices that geometrically define the input primitives to be rendered. In further examples, the input primitives may correspond to primitive data 40 stored in memory 10 of FIG. 2.

Rasterization primitives may correspond to primitives that are capable of being processed by rasterizer stage 54. In some examples, the rasterization primitives may include points, lines, triangles, line streams, triangle streams, etc. In further examples, each input primitive may correspond to a plurality of rasterization primitives. For example, a patch may be tessellated into a plurality of rasterization primitives. In some examples, the rasterization primitives may correspond to a plurality of vertices that geometrically define the rasterization primitives to be rendered.

Rasterizer stage 54 is configured to receive rasterization primitives, and to generate one or more source tiles based on the rasterization primitives. Each of the source tiles may represent a rasterized version of the primitive at a respective one of a plurality of tile locations. For each of the rasterization primitives received, rasterizer stage 54 may rasterize the primitive to generate one or more source tiles for the respective primitive.

A render target may be subdivided into a plurality of tiles (e.g., regions) where each of the tiles contains a plurality of samples. A sample may refer to a pixel or, alternatively, to a sub-sample of a pixel. A pixel may refer to data that is associated with a particular sampling point in a set of sampling points for a rasterized image where the set of sampling points have the same resolution as the display. A sub-sample of a pixel may refer to data that is associated with a particular sampling point in a set of sampling points for a rasterized image where the set of sampling points have a resolution that is greater than the resolution of the display. The data associated with each of the samples may include, for example, color data (e.g., red, green, blue (RGB)), transparency data (e.g., alpha values), and depth data (e.g., z-values).

A destination sample may refer to a composited version of one or more source samples that have been processed for a particular sample location. A destination sample may correspond to sample data that is stored in a render target (e.g., a frame buffer or a binning buffer) for a particular sample location, and may be updated as each of the primitives in a scene is processed. A destination sample may include composited sample data from multiple source samples associated with different primitives. In contrast, a source sample may refer to sample data that is associated with a single geometric primitive and has not yet been composited with other source samples for the same sample location. A source sample may, in some examples, be generated by a rasterizer and processed by one or more pixel processing stages prior to being merged and/or composited with a corresponding destination sample.

Similarly, a destination tile may refer to a plurality of destination samples associated with a particular region of a render target. A destination tile may be a composited version of a plurality of source tiles, each of which may correspond to a different primitive. A destination tile may be updated as each of the primitives in a scene is processed. A source tile may refer to a plurality of source samples associated with a particular region of a render target. A source tile may be associated with a single geometric primitive and has not yet been composited with other source tiles for the same sample location. A source tile may, in some examples, be generated by a rasterizer and processed by one or more pixel processing stages prior to being merged and/or composited with a corresponding destination tile.

The samples in each of the source and destination tiles may correspond to the samples of a region of a render target. The location of the region of the render target may be referred to as a tile location. Two tiles that are associated with the same tile region may be referred to as co-located tiles. In general, source tiles that are not culled may be composited and/or merged into co-located destination tiles.

To rasterize a primitive, rasterizer stage 54 may determine which tile locations of a render target are covered by the primitive, and generate a source tile for each of the tile locations that are covered by the primitive. A tile location may be covered by a primitive if the edges or interior of the primitive cover at least one of the samples associated with the tile location. A sample may be covered by a primitive if the area of the primitive includes the sample location.

Each of the source tiles may include data indicative of a primitive that is sampled at a plurality of sampling points. The primitive that is indicated by the data included in a source tile may be the primitive that rasterizer stage 54 rasterized in order to generate the source tile, and may be said correspond to the source tile. The sampling points at which the primitive is sampled may correspond to tile location of the source tile.

In some examples, for each of the source tiles generated by rasterizer stage 54, rasterizer stage 54 may also generate one or more of the following: a coverage mask for the source tile, information indicative of whether the source tile is fully covered (i.e., completely covered), a conservative nearest z-value for the source tile, and a conservative farthest z-value for the source tile.

The coverage mask for the source tile may be indicative of which samples in the source tile are covered by the primitive that corresponds to the source tile. For example, the coverage mask may include a plurality of bits where each of the bits corresponds to a respective one of a plurality of samples in a source tile that corresponds to the coverage mask. The value of each of the bits may indicate whether a respective one of the samples in the source tile is covered by the primitive that corresponds to the source tile. For example, a value of "1" for a particular bit in the coverage mask may indicate that the sample corresponding to that bit is covered, while a value of "0" for the particular bit in the coverage mask may indicate that the sample corresponding to that bit is not covered.

The information indicative of whether the source tile is fully covered may indicate whether all of the samples in a source tile are covered by a primitive that corresponds to the source tile. In some examples, the information indicative of whether the source tile is fully covered may be one or more bits that equal one of two different values depending on whether all of the samples are covered. If all of the samples included in a source tile are covered by the primitive that corresponds to the source tile, then the source tile may be said to be fully covered. Otherwise, if less than all of the samples included in a source tile are covered by the primitive that corresponds to the source tile, then the source tile may be said to not be fully covered. If at least one of the samples in the source tile is covered by the primitive that corresponds to the source tile, but not all of the samples are covered, then the tile may be said to be a partially covered tile. In other words, a partially covered tile may refer to a tile that is not fully covered, but has at least one sample covered by the primitive that corresponds to the source tile.

The conservative nearest z-value for a source tile may refer to a value that is as near as or nearer than the nearest z-value for all of the covered samples in the source tile. In general, each of the samples in the source tile may have an associated z-value. The z-value for an individual sample in a tile may refer to a value indicative of the distance between the sample and a plane that is perpendicular to the direction of the camera (e.g., viewport) associated with a rendered graphics frame that includes the sample. The conservative nearest z-value for the source tile may be a value that is as near as or nearer than the z-value for the sample that is nearest to the camera associated with the rendered graphics frame. In some examples, the conservative nearest z-value for the source tile may be equal to the nearest z-value for the source tile. In this case, the conservative nearest z-value for the source tile may be referred to as the nearest z-value for the source tile.

A conservative farthest z-value for a source tile may refer to a value that is as far as or farther than the farthest z-value for all of the covered samples in the source tile. In some examples, the conservative farthest z-value for the source tile may be equal to the farthest z-value for the source tile. In this case, the conservative farthest z-value for the source tile may be referred to as the farthest z-value for the source tile.

Different graphics systems may use different types of coordinate systems for generating z-values. Some graphics systems may generate z-value that increase with the distance that the sample is away from the camera. For such systems, whenever this disclosure refers to a nearest z-value or a conservative nearest z-value, such references may also be referred to as, respectively, a minimum z-value and a conservative minimum z-value. Similarly, for such systems, whenever this disclosure refers to a farthest z-value or a conservative farthest z-value, such references may also be referred to as, respectively, a maximum z-value and a conservative maximum z-value.

Other graphics systems may generate z-values that decrease with the distance that the sample is away from the camera. For such systems, whenever this disclosure refers to a nearest z-value or a conservative nearest z-value, such references may also be referred to as, respectively, a maximum z-value and a conservative maximum z-value. Similarly, for such systems, whenever this disclosure refers to a farthest z-value or a conservative farthest z-value, such references may also be referred to as, respectively, a minimum z-value and a conservative minimum z-value.

If this disclosure refers to a minimum or maximum z-value or a conservative minimum or maximum z-value, such z-values should be understood to be referring to minimum and maximum z-values within a particular z-coordinate system where z-values either increase or decrease with the distance away from the camera. It should be further understood that to implement the techniques of this disclosure with another z-coordinate system, then the roles of the references to minimum and maximum z-values may need to be interchanged. In general, if minimum or maximum z-values are referred to in this disclosure without specifying whether the z-coordinate system is an increasing or decreasing coordinate system, it should be understood that these z-values are referring to minimum or maximum z-values within an increasing z-coordinate system where the z-values increase as the distance away from the camera increases.

Z-culling stage 56 receives one or more source tiles, a coverage mask for each of the source tiles, information indicative of whether each of the source tiles is fully covered, a conservative nearest z-value for each of the source tiles, and a conservative farthest z-value for each of the source tiles from rasterizer stage 54, and culls the source tiles based on the received information to generate culled source tiles. The culled source tiles are provided to pixel processing stages 58.

To generate the culled source tiles, z-culling stage 56 may selectively discard from graphics pipeline 50 a source tile of samples associated with a tile location based on whether a conservative nearest z-value of the source tile is farther than a culling z-value associated with the tile location. The culling z-value may be indicative of a conservative farthest z-value for all samples of a destination tile that corresponds to the tile location. For example, z-culling stage 56 may discard a source tile in response to determining that the conservative nearest z-value of the source tile is farther than the culling z-value associated with the tile location, and not discard the source tile in response to determining that the conservative nearest z-value of the source tile is not farther than the culling z-value associated with the tile location.

Discarding a source tile may involve not passing the source tile on to one or more subsequent pixel processing stages 58. In other words, if a source tile is discarded, then z-culling stage 56 may not include the source tile in the set of culled source tiles. Not discarding the source tile may involve passing the source tile on to one or more subsequent pixel processing stages 58. In other words, if a source tile is not discarded, then z-culling stage 56 may include the source tile in the set of culled source tiles.

LRZ buffer 60 may store a set of culling z-values. The set of culling z-values may include a culling z-value for each of the tile locations in a render target. Each of the culling z-values may be indicative of a conservative farthest z-value for all of the samples in a corresponding one of a plurality of destination tiles. A destination tile may correspond to a culling z-value if the tile location associated with the culling z-value is the same as the tile location for the destination tile.

In some examples, LRZ buffer 60 may be an off-chip memory that is located on a different microchip than the microchip upon which graphics pipeline 50 is formed. For example, in computing device 2 shown in FIGS. 1 and 2, LRZ buffer 60 may be located in memory 10. In additional examples, LRZ buffer 60 may be an on-chip memory that is located on and/or formed on the same microchip as the microchip upon which graphics pipeline 50 is formed (e.g., the microchip upon which GPU 12 is formed). LRZ buffer 60 may include one or more volatile memories or storage devices, such as, for example, random access memory (RAM), static RAM (SRAM), dynamic RAM (DRAM), etc.

It should be noted that, although the culling z-values may be indicative of conservative farthest z-values of corresponding destination tiles, a destination tile may not actually be generated by z-culling stage 56. Instead, a destination tile may be generated by pixel processing stages 58 in graphics pipeline 50 and z-culling stage 56 may not necessarily have access to the actual destination tile. However, z-culling stage 56 may update the culling z-values in a manner that guarantees that the culling z-value will be at least as far as the farthest z-value in a destination tile that is subsequently generated by pixel processing stages 58.

Z-culling stage 56 may update a culling z-value for a tile location based on one or more of a coverage mask associated with a source tile corresponding to the tile location, information indicative of whether the source tile is fully covered, a conservative farthest z-value for the source tile, a conservative nearest z-value for the source tile, and a culling z-value for the tile location. Each time a source tile is processed by z-culling stage 56, z-culling stage 56 may determine whether a culling z-value for a tile location that corresponds to the source tile is to be updated. In some examples, if z-culling stage 56 determines that the source tile is to be discarded, then z-culling stage 56 may determine that the culling z-value is not to be updated. If z-culling stage 56 determines that the source tile is not to be discarded, then z-culling stage 56 may determine whether the culling z-value for the tile location corresponding to the source tile is to be updated using one or more techniques depending on whether the source tile is fully covered or partially covered.

For a fully-covered source tile, z-culling stage 56 may determine whether a conservative farthest z-value for the source tile is nearer than the culling z-value for the tile location that corresponds to the source tile. If the conservative farthest z-value for the source tile is nearer than the culling z-value, then z-culling stage 56 may set the culling z-value equal to the conservative farthest z-value for the source tile. If the conservative farthest z-value for the source tile is not nearer than the culling z-value, then z-culling stage 56 may maintain the previous culling z-value (i.e., not update the culling z-value).

According to this disclosure, for a partially-covered source tile, z-culling stage 56 may selectively merge the source tile with a merged source tile for the tile location to generate an updated version of the merged source tile based on whether a conservative farthest z-value of the source tile is nearer than the culling z-value associated with the tile location. For example, z-culling stage 56 may merge the source tile with the merged source tile for the tile location in response to determining that the conservative farthest z-value of the source tile is nearer than the culling z-value associated with the tile location, and not merge the source tile with the merged source tile for the tile location in response to determining that the conservative farthest z-value of the source tile is not nearer than the culling z-value associated with the tile location.

Selectively merging source tiles in this manner may improve the quality of culling z-values that are used to perform z-culling, which may improve the rejection efficiency of the z-culling algorithm performed by z-culling stage 56. Improving the rejection efficiency of the z-culling algorithm performed by z-culling stage 56 may reduce the processing workload that needs to be performed by pixel processing stages 58 and/or reduce the memory bandwidth used by pixel processing stages 58. In this way, the techniques described in this disclosure for selectively merging source tiles may improve the performance of and/or memory bandwidth usage of a graphics processor that performs hierarchical z-culling.

A merged source tile may conceptually correspond to a plurality of merged samples associated with a particular region of a render target. Each of the merged samples may be associated with a respective sample location, and conceptually correspond to a merged version of the samples at the respective sample location for all of the partially-covered source tiles that correspond to the merged source tile. A merged version of the samples at the respective sample location may correspond to a composited version of the samples at the respective sample location. A partially-covered source tile may correspond to a merged source tile if the partially-covered source tile was merged into the merged source tile.

Although a merged source tile may conceptually correspond to a plurality of merged samples, in some examples, no sample-specific data is necessarily stored, tracked, and/or composited for the merged source tile. Instead, in such examples, graphics pipeline 50 may, in some examples, store a conservative farthest z-value and/or a coverage mask for the merged source tile.

A conservative farthest z-value for a merged source tile may refer to a value that is as far as or farther than the farthest z-value for all of the covered samples in the merged source tile. In some examples, the conservative farthest z-value for the merged source tile may be equal to the farthest z-value for all covered samples in the merged source tile. In this case, the conservative farthest z-value for the merged source tile may be referred to as the farthest z-value for the merged source tile.

It should be noted that, although the conservative farthest z-value for a merged source tile may be indicative of a value that is as far as or farther than the farthest z-value for all of the covered samples in the merged source tile, this does not necessarily mean that any sample-specific z-values are actually tracked and stored for the merged source tile. Instead, the conservative farthest z-value may be updated in a manner that guarantees that the value will be at least as far as the farthest z-value for all of the covered samples of the merged source tile. In this way, in some examples, no sample-specific z-values are tracked and stored for the merged source tile.

A coverage mask for a merged source tile may be indicative of which samples of the merged source tile are covered by the primitive that corresponds to the merged source tile. For example, the coverage mask may include a plurality of bits where each of the bits corresponds to a respective one of a plurality of samples in a merged source tile that corresponds to the coverage mask. The value of each of the bits may indicate whether a respective one of the samples in the merged source tile is covered by the primitive that corresponds to the source tile. For example, a value of "1" for a particular bit in the coverage mask may indicate that the sample corresponding to that bit is covered, while a value of "0" for the particular bit in the coverage mask may indicate that the sample corresponding to that bit is not covered.

A covered sample for the merged source tile may refer to a sample that is covered by at least one of the primitives that correspond to the merged source tile. A primitive may correspond to the merged source tile if the primitive was used to generate a partially-covered source tile that was merged into the merged source tile.

As discussed above, when merging a partially-covered source tile, z-culling stage 56 may merge with the partially-covered source tile with a merged source tile for the tile location that corresponds to the source tile. If the source tile is the first partially-covered source tile to be processed, then the merged source tile may be a default merged source tile. In some examples, the merged source tile may be defined by a conservative farthest z-value for the merged source tile and a coverage mask for the merged source tile. In such examples, the default merged source tile may have a default conservative farthest z-value that is set to a farthest z-value that is used by the graphics system and a default coverage mask that indicates that no samples in the merged source tile are covered. In such examples, additional data need not necessarily be stored for the default merged source tile. For example, color components, alpha components, and depth components for individual samples in the merged source tile do not necessarily need to be calculated or stored for the default merged source tile.

To merge a partially-covered source tile with a merged source tile, z-culling stage 56 may, in some examples, generate a coverage mask for the updated version of the merged source tile based on a coverage mask for the source tile and a coverage mask for a current version of the merged source tile. For example, z-culling stage 56 may perform a bit-wise OR operation on the coverage mask for the partially-covered source tile with the coverage mask for the merged source tile to generate a coverage mask for the updated version of the source tile.

To merge the partially-covered source tile with a merged source tile, z-culling stage 56 may also, in some examples, generate a conservative farthest z-value for the updated version of the merged source tile based on the conservative farthest z-value of the source tile and a conservative farthest z-value for a current version of the merged source tile. For example, z-culling stage 56 may determine a farthest z-value from the set of z-values that includes the conservative farthest z-value for the partially-covered source tile and the conservative farthest z-value for the merged source tile in order to generate the conservative farthest z-value for the updated version of the merged source tile.

In some examples, if all of the samples that are covered by the merged source tile are also covered by the source tile and if the conservative farthest z-value for the source tile is nearer than the conservative farthest z-value for the merged source tile, then the conservative farthest z-value for the updated version of the merged source tile may be determined in a different fashion than that which is discussed above. In such examples, the conservative farthest z-value for the updated version of the merged source tile may be set equal to the conservative farthest z-value for the source tile. In this case, the conservative farthest z-value for the updated version of the merged source tile can be set to the conservative farthest z-value for the source tile because all of the samples in the current version of the merged source tile will be occluded by the samples in the source tile. Because the conservative farthest z-value for the source tile is nearer to the camera in this case than the maximum of the conservative farthest z-values for the source tile and the current version of the merged source tile, a better quality conservative farthest z-value may be obtained for the merged source tile, which may result in a better quality culling z-value for the tile location. A better quality culling z-value may increase the discard rate for the z-culling algorithm.

After merging a partially-covered source tile with a merged source tile for a tile location, z-culling stage 56 may update the culling z-value with the conservative farthest z-value for the updated version of the merged source tile if the update version of the merged source tile is fully covered. Otherwise, z-culling stage 56 may maintain the same culling z-value (i.e., not update the culling z-value), and store the updated version of the merged source tile for future use in subsequent merging operations.

In other words, z-culling stage 56 may selectively set the culling z-value equal to a conservative farthest z-value for an updated version of the merged source tile based on whether the updated version of the merged source tile is fully covered by a set of primitives that corresponds to the updated version of the merged source tile. For example, z-culling stage 56 may set the culling z-value equal to the conservative farthest z-value for the updated version of the merged source tile in response to determining that the updated version of the merged source tile is fully covered by a set of primitives that corresponds to the updated version of the merged source tile, and not set the culling z-value equal to the conservative farthest z-value for the updated version of the merged source tile in response to determining that the updated version of the merged source tile is not fully covered by the set of primitives.

The set of primitives that corresponds to the updated version of the merged source tile may include the primitives that correspond to each of the partially-covered source tiles that were merged into the updated version of the merged source tile. A primitive may correspond to a partially-covered source tile if the partially-covered source tile was generated in response to rasterizing the primitive.

Merge cache 62 may store data indicative of a merged source tile for one or more tile locations. In some examples, the data indicative of the merged source tile may include a coverage mask for the merged source tile and a conservative farthest z-value for the merged source tile. In some examples, each tile location in render target may be associated with at most one merged source tile.

Merge cache 62, in some examples, may correspond to memory 36 as discussed above with respect to FIG. 2. In some examples, merge cache 62 may be implemented as a memory unit with control functionality that implements the mapping and overwriting techniques described in this disclosure. In further examples, merge cache 62 may be implemented as a hardware cache unit. In such examples, some or all of the built-in mapping and overwriting functionality of the cache unit, in some examples, may be used to implement the mapping and overwriting techniques described in this disclosure.

In some examples, the data capacity of merge cache 62 may be less than the data capacity needed to store merged source tile data for all of the tile locations in a render target. In such examples, it is possible that a merged source tile that is partially-covered, but not yet fully-covered, may be overwritten by a merged source tile from another tile location prior to the merged source tile becoming fully covered. This may prevent the overwritten merged source tile from being used to update the culling z-value to a potentially more favorable value if the merged source tile would have become fully covered in the future. Although this has the potential to reduce the quality of culling z-value (i.e., how close the culling z-values are to the actual z-values), the benefits achieved by using a relatively small memory may, in some cases, outweigh any decrease in culling performance due to data overwrites.

In some examples, z-culling stage 56 may store a plurality of merged source tile data records in merge cache 62. Each of the merged source tile data records may include data associated with a merged source tile for a respective one of a plurality of tile locations of a render target. In this example, merge cache 62 may have a data capacity that is smaller than an amount of data required to store N merged source tile data records, where N is a total number of tile locations in the render target.

In some examples, the data associated with the merged source tile that is included in a data record for a tile location may include a conservative farthest z-value for the merged source tile associated with the tile location. In further examples, the data associated with the merged source tile that is included in a data record for a tile location may include a coverage mask for the merged source tile associated with the tile location. In additional examples, the data associated with the merged source tile that is included in a data record for a tile location may include both a conservative farthest z-value for the merged source tile associated with the tile location and a coverage mask for the merged source tile associated with the tile location.

Merge cache 62 may include one or more volatile or non-volatile memories or storage devices, such as, e.g., random access memory (RAM), static RAM (SRAM), dynamic RAM (DRAM), cache units etc. In some examples, memory 36 may be an on-chip memory that is located on a same microchip as the microchip upon which graphics pipeline 50 is formed (e.g., the same microchip as GPU 12).

In further examples, merge cache 62 may be a cache unit (e.g., an on-chip cache unit). In such examples, merge cache 62 may not be associated with an underlying memory. Merge cache 62 may not be associated with an underlying memory in the sense that merge cache 62 may service all read and write requests without accessing an underlying memory. Moreover, if there is not enough mapped memory space in merge cache 62 available to store incoming data associated with a merged source tile, merge cache 62 may overwrite data associated with another merged source tile with the incoming data. For example, merge cache 62 may be configured to write a first data record associated with a first tile location to a cache line in merge cache 62 without writing the first data record to an underlying memory, and to overwrite the first data record with a second data record associated with a second tile location without writing the first data record to an underlying memory.

In examples where merge cache 62 is implemented as a cache unit, z-culling stage 56 may, in some examples, store a plurality of merged source tile data records in merge cache 62.

Each of the merged source tile data records may include data associated with a merged source tile for a respective one of a plurality of tile locations of a render target. In such examples, merge cache 62 may include a plurality of cache lines, and each of the cache lines may be configured to store a respective one of the data records. In such examples, a total number of caches lines in the merge cache 62 may be less than a total number of tile locations in the render target.

Merge cache 62 may act as the primary data store for merged source tile data rather than merely as a cached data store for storing copies of data that are primarily stored in another underlying memory. Cache units are typically designed to store a smaller amount of data than the underlying memory space for which such cache units provide caching services. Thus, cache units often implement various mapping policies (e.g., direct mapped, set-associative, fully-associative, etc.) and replacement policies (e.g., least recently used, least frequently used, random, etc.) to determine where data will be stored in the cache and which data will be overwritten in the cache. Using a cache unit as the primary storage unit for storing merged source tile data may allow a graphics system to leverage these built-in mechanisms for determining where data is stored in a cache unit and which data is overwritten in a cache unit even if the cache unit does not keep an extra copy in the underlying memory. This may simplify the design of and/or reduce the amount of area needed to implement a memory unit for storing merged source tile data.

In some examples, each of the tile locations in a render target may correspond to a respective one of a plurality of addresses in an address space of merge cache 62. Merge cache 62 may map the addresses in the address space to sets of storage slots in merge cache 62. Merge cache 62 may have less storage slots than addresses in the address space for merge cache 62. Thus, merge cache 62 may map multiple addresses to the same storage slot or same set of storage slots. If merge cache 62 is a cache unit, merge cache 62 may use, in some examples, any of a direct mapping scheme, a set associative mapping scheme, and a fully associative mapping scheme to map addresses to storage slots.

In order to merge a partially-covered source tile with a merged source tile, z-culling stage 56 may issue a read request to merge cache 62 in order to obtain the merged source tile data (e.g., coverage mask and conservative farthest z-value) for a merged source tile that has the same tile location as the partially-covered source tile. Z-culling stage 56 may include an address for the read request that corresponds to the tile location of the partially-covered source tile. In some cases, the address may be equal to the tile location of the partially-covered source tile.

In response receiving the read request, merge cache 62 may search the storage slots in merge cache 62 to determine if there is an entry (e.g., data record) in the storage slots that corresponds to the tile location indicated by the address received with the read request. If an entry is found that corresponds to the tile location, merge cache 62 may return the data included in the entry (e.g., a coverage mask and a conservative farthest z-value). If an entry is not found, merge cache 62 may return an indication that no entry was found.

If an entry was found in merge cache 62 for the tile location that corresponds to the partially-covered source tile, then z-culling stage 56 may merge the partially-covered source tile with the merged source tile to generate an updated version of the partially-covered source tile. For example, z-culling stage 56 may generate a coverage mask and a conservative farthest z-value for the updated version of the merged source tile using the techniques described in this disclosure.

If the updated version of the merged source tile is fully covered, then z-culling stage 56 may update the culling z-value with the conservative farthest z-value for the merged source tile, and cause merge cache 62 to invalidate the merged source tile data that corresponds to the tile location. If the updated version of the merged source tile is not fully covered, then z-culling stage 56 may issue a write request to merge cache 62 with an address that corresponds to the tile location. The data to be written with the write request may include the coverage mask and the conservative farthest z-value for the updated version of the merged source tile. In response to receiving the write request, merge cache 62 may map the address to a storage slot, and write the data to the storage slot. In some examples, merge cache 62 may overwrite the data stored in the storage slot for the previous version of the merged source tile with the data for the updated version of the merged source tile.

If an entry was not found in merge cache 62 when processing the read request for the tile location that corresponds to the partially-covered source tile, then z-culling stage 56 may generate a coverage mask and a conservative farthest z-value for the updated version of the merged source tile such that the coverage mask and the conservative farthest z-value for the updated version of the merged source tile are equal, respectively, to the coverage mask and the conservative farthest z-value for the partially-covered source tile. Generating the coverage mask and the conservative farthest z-value for the updated version of the merged source tile in this manner may correspond to merging the partially-covered source tile with a default merged source tile where the default merged source tile includes a default farthest conservative farthest z-value and a default coverage mask that indicates that no samples are covered.

Because no entry was found in merge cache 62, z-culling stage 56 may cause merge cache 62 to allocate a new storage slot in merge cache 62 to store the merged source tile data. For example, z-culling stage 56 may issue a write request to merge cache 62 with an address that corresponds to the tile location, which may cause merge cache 62 to allocate a storage slot in merge cache 62 to store the merged source tile data. The data to be written with the write request may include the coverage mask and the conservative farthest z-value for the updated version of the merged source tile.

In response to receiving the write request, merge cache 62 may determine a storage slot to use for storing the merged source tile data based on the address received with the write request and one or more mapping rules. If all of the storage slots that map to the received address are filled, merge cache 62 may select a storage slot to overwrite based on a replacement policy implemented by merge cache 62. Example replacement policies include a least recently used (LRU) replacement policy, a least frequently used (LFU) replacement policy, and a random replacement policy.

If merge cache 62 is a cache unit, merge cache 62 may include a plurality of cache lines. In some examples, each of the cache lines may act as a storage slot for merged source tile data associated with a respective merged source tile. For example, each of the cache lines may be subdivided into a coverage mask field and a conservative farthest z-value field.

Depending on the mapping scheme, each of the cache lines may also include a tag field. The tag field may contain one or more bits of the address that is associated with the merged source tile. In examples where the address of the merged source tile is equal to the tile location, the tag may, in some examples, contain one or more bits indicative of the tile location. In some examples, the tile location for a tile may correspond to the screen coordinates (e.g., (x, y) coordinates) for the tile.

In examples where merge cache 62 is a cache unit and the cache lines include a tag field, in order to search for a particular merged source tile in the cache unit, merge cache 62 may map the address received with the read or write request to one or more cache lines depending on the mapping rules. Then, merge cache 62 may compare some or all of the address bits to the bits contained in the tag field for a cache line to determine whether the tag field for the cache line matches the address field. If the tag field for the cache line matches the address field, then merge cache 62 may retrieve the data for a read request or overwrite the data for a write request. Otherwise, if the tag field for the cache line does not match the address field, then merge cache 62 may search other cache lines for the desired entry. If no matching cache line is found for a read request, merge cache 62 may return an indication that merged source tile data was not found in the cache for a particular tile read request. If no matching cache line is found for a write request, merge cache 62 may allocate a new cache line for the write data, or if no cache lines are available, merge cache 62 may overwrite another cache line associated with another merged source tile.

If merge cache 62 is a cache unit, z-culling stage 56 may cause merge cache 62 to invalidate the merged source tile data by causing merge cache 62 to invalidate the cache line that corresponds to the merged source tile data. Invalidating the cache line may cause merge cache 62 to not return data stored in the invalidated cache line in response to a read request even if the tag stored in the cache line were to match the address.

Pixel processing stages 58 may receive the culled source tiles from z-culling stage 56 and perform pixel processing on the culled source tiles to generate destination tiles. Pixel processing may include, for example, pixel shading operations, blending operations, texture-mapping operations, programmable pixel shader operations, etc. In some examples, some or all of pixel processing stages 58 may process the samples in a source tile together. In further examples, some or all of pixel processing stages 58 may process each of the samples in a source tile independently of each other. In some examples, pixel processing stages 58 may include an output merger stage that merges or composites a source tile into a co-located destination tile (i.e., a destination tile that has the same location as the source tile). In some cases, the destination tiles generated by pixel processing stages 58 may be placed into a render target (e.g., a frame buffer or binning buffer).

Figure 4:
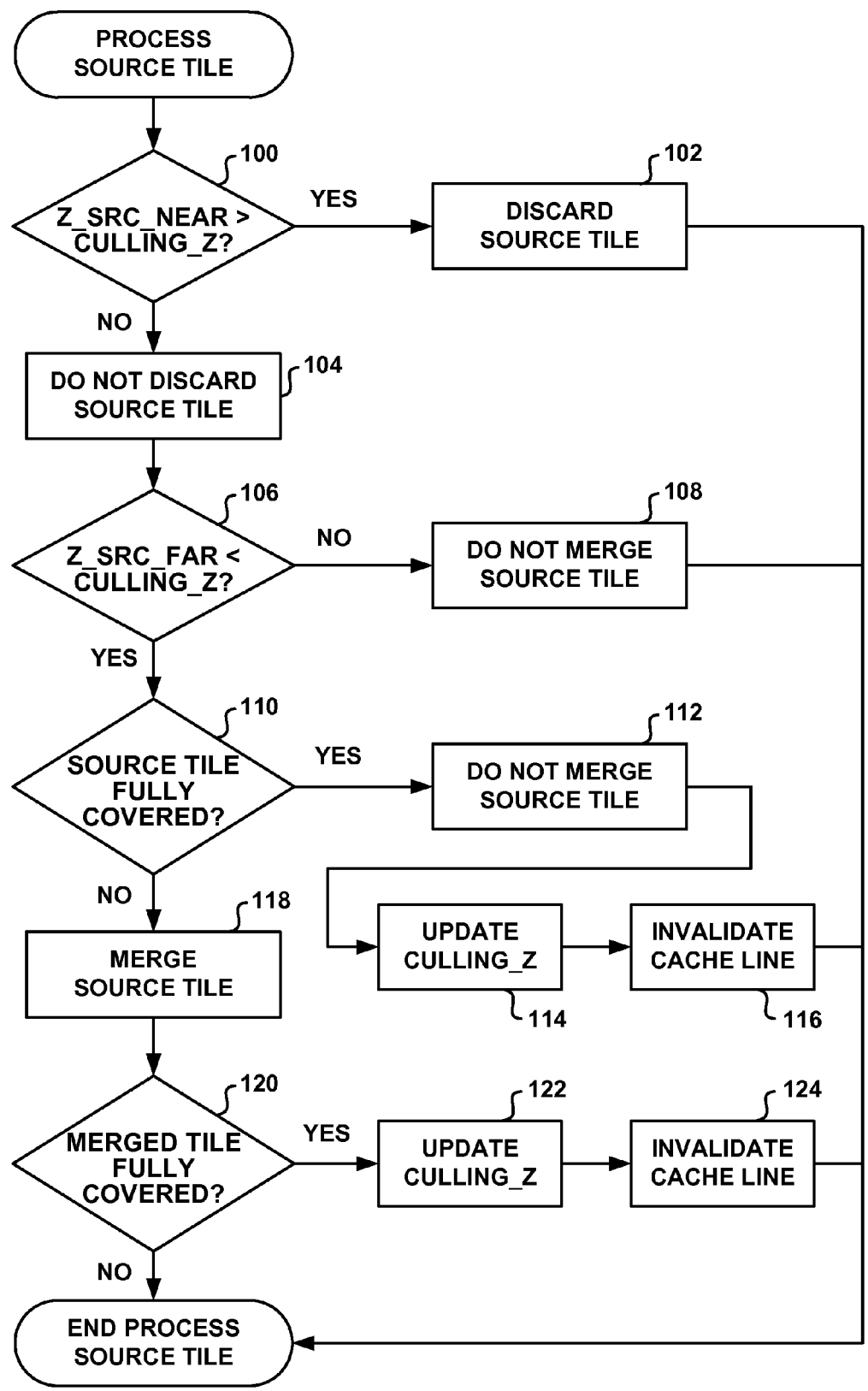
FIG. 4 is a flow diagram illustrating an example technique for performing hierarchical z-culling according to this disclosure.

FIG. 4 is a flow diagram illustrating an example technique for performing hierarchical z-culling according to this disclosure. In some examples, the technique shown in FIG. 4 may be implemented in GPU 12 of FIGS. 1 and 2 and/or in z-culling stage 56 of FIG. 3. For purposes of this description, the technique will be described as being performed by GPU 12 although it should be understood that the technique may be performed by other components or devices or in other types of graphics processing systems.

The technique shown in FIG. 4 assumes an increasing z-coordinate system where the z-values increase as the distance away from the camera increases. Thus, where greater than or less than comparisons are shown in FIG. 4, it should be understood that in a decreasing z-coordinate system where the z-values decrease as the distance away from the camera increases, such comparisons should be reversed. That is, greater than or less than comparisons should be interchanged.

GPU 12 may initiate the process source tile technique in response to receiving a source tile from a rasterizer or another processing stage in a graphics pipeline. In some examples, rasterizer stage 54 may generate the source tile, and z-culling stage 56 may receive the source tile from rasterizer stage 54. In further examples, rasterizer stage 54 may also generate and z-culling stage 56 may receive from rasterizer stage 54 one or more of the following: a coverage mask for the source tile (i.e., Src_Mask), information indicative of whether the source tile is fully covered (i.e., completely covered), a conservative nearest z-value for the source tile (i.e., Z_Src_Near), and a conservative farthest z-value for the source tile (i.e., Z_Src_Far).

In response to receiving a source tile to process, GPU 12 may obtain a culling z-value (i.e., Culling_Z) for a tile location that corresponds to the tile location of the source tile. In some examples, GPU 12 may obtain the culling z-value from a memory or a buffer that stores culling z-values (e.g., LRZ buffer 60). The culling z-value may be indicative of a conservative farthest z-value for all samples of a destination tile that corresponds to the tile location of the source tile.

GPU 12 determines whether the conservative nearest z-value for the source tile is greater than (i.e., farther away than) the culling z-value (100). In response to determining that the conservative nearest z-value for the source tile is greater than (i.e., farther away than) the culling z-value, GPU 12 discards the source tile (102) and ends the processing for the source tile. Discarding the source tile may include not passing the source tile on to one or more subsequent stages of a graphics pipeline (e.g., pixel processing stages 58 of graphics pipeline 50). When GPU 12 discards the source tile, because all of the z-values in the source tile are farther than the culling z-value already in use, GPU 12 does not further analyze the source tile for purposes of updating the culling z-value.

Returning to decision block 100, in response to determining that the conservative nearest z-value for the source tile is not greater than (i.e., not farther away than) the culling z-value, GPU 12 does not discard the source tile (104). Not discarding the source tile may include passing the source tile onto one or more subsequent stages of a graphics pipeline (e.g., pixel processing stages 58 of graphics pipeline 50) for further processing. When GPU 12 does not discard the source tile, GPU 12 performs further analysis on the source tile to determine whether the culling z-value should be updated based on the source tile and/or to determine whether to merge the source tile with a merged source tile for the tile location.

More specifically, if the source tile is not discarded, GPU 12 determines whether the conservative farthest z-value for the source tile is less than (i.e., nearer than) the culling z-value (106). In response to determining that the conservative farthest z-value for the source tile is not less than (i.e., not nearer than) the culling z-value, GPU 12 does not merge the source tile with the merged source tile for the tile location (108). GPU 12 also does not update the culling z-value. Instead, because the conservative farthest z-value for the source tile is farther than the culling z-value that is already in use, GPU 12 ends the processing of the source tile to determine whether to update the culling z-value. However, subsequent stages of the graphics pipeline (e.g., pixel processing stages 58 of graphics pipeline 50) may perform additional pixel processing on the source tile.

Returning to decision block 106, in response to determining that the conservative farthest z-value for the source tile is less than (i.e., nearer than) the culling z-value, GPU 12 determines whether the source tile is fully covered (110). A source tile may be fully covered when all of the samples of the source tile are covered by a primitive that corresponds to the source tile. A sample may be covered by a primitive if the area of the primitive includes the sample location. A primitive may correspond to the source tile if the source tile is generated in response to rasterizing the primitive.

In response to determining that the source tile is fully covered, GPU 12 does not merge the source tile (112). Instead, GPU 12 updates the culling z-value based on the conservative farthest z-value of the fully-covered source tile (114). For example, GPU 12 may set the culling z-value equal to the conservative farthest z-value of the fully-covered source tile. GPU 12 invalidates a merge cache line, if any, that is associated with the tile location of the source tile (116). The processing of the source tile for hierarchical z-culling purposes ends. However, subsequent stages of the graphics pipeline (e.g., pixel processing stages 58 of graphics pipeline 50) may perform additional pixel processing on the source tile.

Returning to decision block 110, in response to determining that the source tile is not fully covered (i.e., that the source tile is partially covered), GPU 12 merges the source tile with a merged source tile for the tile location to generate an updated version of the merged source tile (118). Further details regarding the merge operation are discussed below with respect to FIG. 5.

After merging the source tile, GPU 12 determines whether the updated version of the merged source tile is fully covered (120). The updated version of the merged source tile may be fully covered when all of the samples of the updated version of the merged source tile are covered by a set of primitives that corresponds to the updated version of the merged source tile. The set of primitives that corresponds to the updated version of the merged source tile may include the primitives that correspond to each of the partially-covered source tiles that were merged into the updated version of the merged source tile. A primitive may correspond to a partially-covered source tile if the partially-covered source tile was generated in response to rasterizing the primitive.

In response to determining that the updated version of the merged source tile is fully covered, GPU 12 updates the culling z-value based on the conservative farthest z-value of the fully-covered merged source tile (122). For example, GPU 12 may set the culling z-value equal to the conservative farthest z-value of the fully-covered merged source tile. GPU 12 invalidates the merge cache line that is associated with the tile location of the source tile (124). The processing of the source tile for hierarchical z-culling purposes ends. However, subsequent stages of the graphics pipeline (e.g., pixel processing stages 58 of graphics pipeline 50) may perform additional pixel processing on the source tile.

In response to determining that the updated version of the merged source tile is not fully covered, GPU 12 does not update the culling z-value. Instead, GPU 12 stores the merged source tile data for use when processing subsequent source tiles. The processing of the source tile for hierarchical z-culling purposes ends. However, subsequent stages of the graphics pipeline (e.g., pixel processing stages 58 of graphics pipeline 50) may perform additional pixel processing on the source tile.

Figure 5:
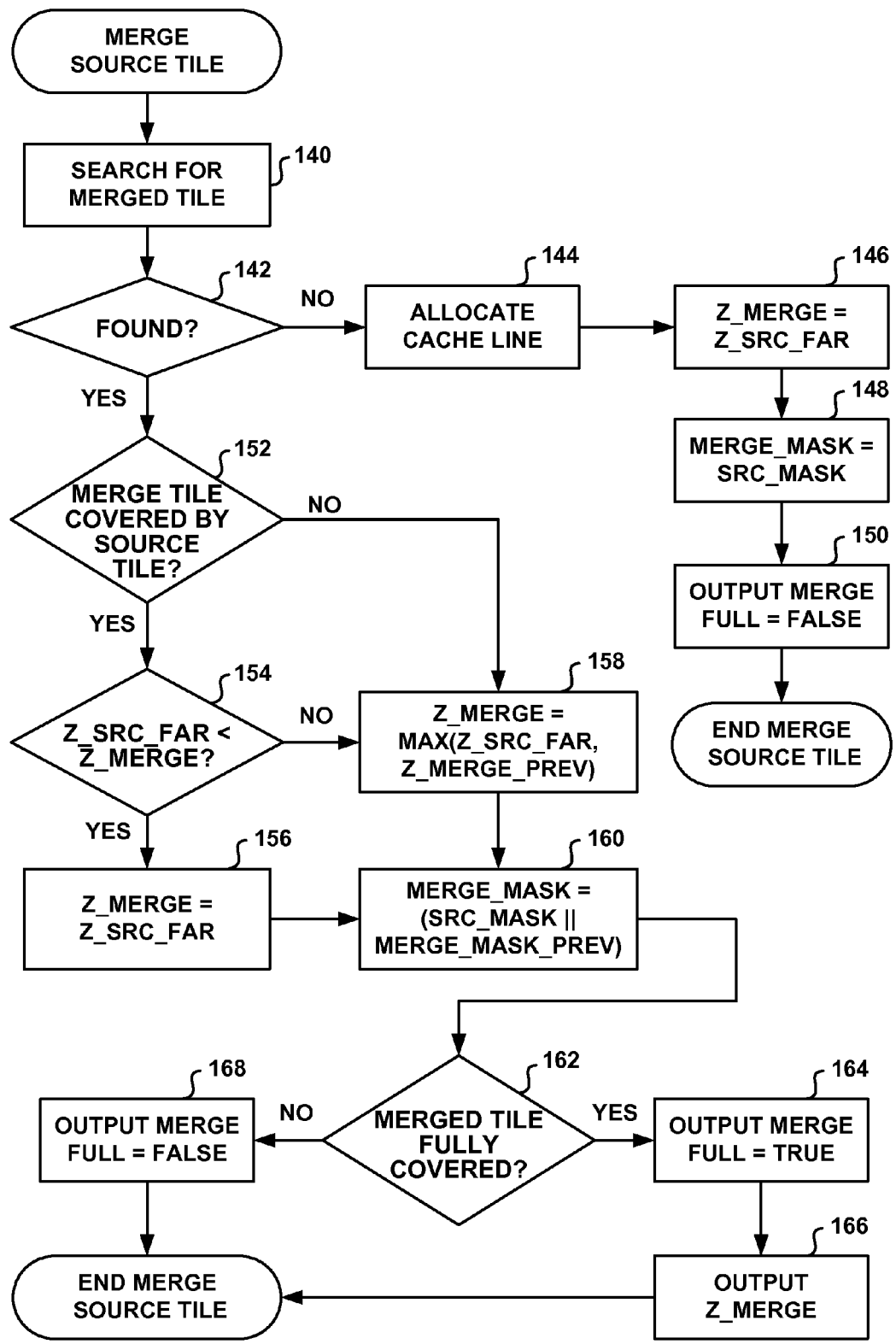
FIG. 5 is a flow diagram illustrating an example technique for merging partially-covered source tiles when performing hierarchical z-culling according to this disclosure.

FIG. 5 is a flow diagram illustrating an example technique for merging partially-covered source tiles when performing hierarchical z-culling according to this disclosure. In some examples, the technique shown in FIG. 5 may be implemented in GPU 12 of FIGS. 1 and 2 and/or in z-culling stage 56 of FIG. 3. For purposes of this description, the technique will be described as being performed by GPU 12 although it should be understood that the technique may be performed by other components or devices or in other types of graphics processing systems.

In some examples, the technique shown in FIG. 5 may be used to implement process block 118 in FIG. 4. Similar to the FIG. 4, the technique shown in FIG. 5 assumes an increasing z-coordinate system where the z-values increase as the distance away from the camera increases. Thus, where greater than or less than comparisons are shown in FIG. 5, it should be understood that in a decreasing z-coordinate system where the z-values decrease as the distance away from the camera increases, such comparisons should be reversed. That is, greater than or less than comparisons should be interchanged. Similarly, in a decreasing z-coordinate system, a maximum function should be replaced with a minimum function.

GPU 12 may initiate the merge source tile technique shown in FIG. 5 in response to receiving a partially-covered source tile. In some examples, GPU 12 may initiate the merge source tile technique shown in FIG. 5 in response to determining that a source is not fully covered and in response to determining that the conservative farthest z-value for the source tile is less than (i.e., is nearer than) the culling z-value as illustrated by decision blocks 106 and 110 in FIG. 4.

GPU 12 searches for a merged source tile that has a tile location which corresponds to the partially-covered source tile in a cache unit (e.g., merge cache 62) (140). GPU 12 determines whether a merged source tile for the tile location was found in the cache unit (142). In other words, GPU 12 determines whether there was a hit in the cache for the tile location.

In response to determining that the merged source tile was not found, GPU 12 allocates a new cache line in the cache unit for a merged source tile associated with the tile location that corresponds to the partially-covered source tile (144). In some examples, the mapping scheme of the cache unit may map each of the tile locations (e.g., addresses) to a set of one or more cache lines. If none of the cache lines to which the tile location map are available, then the cache unit may, in some examples, overwrite the merged source tile data for another tile location that is stored in the set of cache lines that map to the tile location with the merged source tile data associated with the currently processed tile location.

GPU 12 sets the conservative farthest z-value for the merged source tile (i.e., Z_Merge) equal to the conservative farthest z-value for the source tile (i.e., Z_Src_Far) (146). GPU 12 sets the coverage mask for the merged source tile (i.e., Merge_Mask) equal to the coverage mask for the partially-covered source tile (i.e., Src_Mask). GPU 12 sets the merge full variable to false to indicate that the merged source tile is not fully covered, outputs the merge full variable (150), and ends the merging process. The merge full variable may be used by the technique in FIG. 4 (e.g., decision block 120) to determine whether the updated version of the merged source tile is fully covered.

Returning to decision block 142, in response to determining that the merged source tile was found, GPU 12 obtains the merged source tile data from the cache unit. The merged source tile data may include a conservative farthest z-value for the merged source tile (i.e., Z_Merge) and a coverage mask for the merged source tile (i.e., Merge_Mask).

GPU 12 determines whether all of the sample locations that are covered by the merged source tile are also covered by the partially-covered source tile (152). In some examples, to perform this operation, GPU 12 may perform a bit-wise AND operation on the coverage mask for the merged source tile and the coverage mask for the partially-covered source tile, and determine whether the result of the bitwise AND operation equals the coverage mask for the merged source tile. If the result of the bitwise AND operation equals the coverage mask for the merged source tile, then all of the sample locations that are covered by the merged source tile are also covered by the partially-covered source tile.

In response to determining that all of the sample locations that are covered by the merged source tile are also covered by the partially-covered source tile, GPU 12 determines whether the conservative farthest z-value for the source tile (i.e., Z_Src_Far) is less than (i.e., is nearer than) the conservative farthest z-value for the merged source tile (i.e., Z_Merge) (154). In response to determining that the conservative farthest z-value for the source tile is less than (i.e., is nearer than) the conservative farthest z-value for the merged source tile, GPU 12 sets the conservative farthest z-value for the updated version of the merged source tile (i.e., Z_Merge) equal to the conservative farthest z-value for the source tile (i.e., Z_Src_Far) (156). GPU 12 also sets the coverage mask for the updated version of the merged source tile equal to the result of the bitwise OR operation of the coverage mask for the source tile (i.e., Src_Mask) and the coverage mask for the previous version of the merged source tile (i.e., Merge_Mask_Prev) (160). The previous version of the merged source tile may correspond to the version of the merged source tile that is prior to the updated version of the merged source tile, and in some examples, may be alternatively referred to as a current version of the merged source tile.

In this case, the conservative farthest z-value for the updated version of the merged source tile can be set to the conservative farthest z-value for the source tile because all of the samples in the previous version of the merged source tile will be occluded by the samples in the source tile. Because the conservative farthest z-value for the source tile is nearer to the camera in this case than the maximum of the conservative farthest z-values for the source tile and the previous version of the merged source tile, a better quality conservative farthest z-value may be obtained for the merged source tile, which may result in a better quality culling z-value for the tile location. A better quality culling z-value may increase the discard rate for the z-culling algorithm.

Returning to decision blocks 152 and 154, in response to determining that all of the sample locations that are covered by the merged source tile are not also covered by the partially-covered source tile or in response to determining that the conservative farthest z-value for the source tile is not less than (i.e., is not nearer than) the conservative farthest z-value for the merged source tile, GPU 12 sets the conservative farthest z-value for the updated version of the merged source tile (i.e., Z_Merge) equal to the maximum (i.e., the farthest) of the conservative farthest z-value for the source tile (i.e., Z_Src_Far) and the conservative farthest z-value for the previous version of the merged source tile (i.e., Merge_Mask_Prev) (158). GPU 12 also sets the coverage mask for the updated version of the merged source tile equal to the result of the bitwise OR operation of the coverage mask for the source tile (i.e., Src_Mask) and the coverage mask for the previous version of the merged source tile (i.e., Merge_Mask_Prev) (160).

GPU 12 determines if the merged source tile is fully covered (162). The merged source tile may be fully covered when all of the samples in the merged source tile are covered by the set of primitives that correspond to the merged source tile. The set of primitives that correspond to the merged source tile may include the primitives that correspond to each of the partially-covered source tiles that were previously merged into the merged source tile.

In response to determining that the merged source tile is fully covered, GPU 12 sets the merge full return variable to true to indicate that the merged source tile is fully covered (164). The merge full variable may be used by the technique in FIG. 4 (e.g., decision block 120) to determine whether the updated version of the merged source tile is fully covered. GPU 12 also outputs the conservative farthest z-value for the updated version of the merged source tile (i.e., Z_Merge) (166). The conservative farthest z-value for the updated version of the merged source tile may be used by the technique in FIG. 4 (e.g., process blocks 114 and 122) to update the culling z-value. GPU 12 ends the merging process.

Returning to decision block 162, in response to determining that the merged source tile is not fully covered, GPU 12 sets the merge full variable to false to indicate that the merged source tile is not fully covered, outputs the merge full variable (168), and ends the merging process. Again, the merge full variable may be used by the technique in FIG. 4 (e.g., decision block 120) to determine whether the updated version of the merged source tile is fully covered.

It should be noted that although decision blocks 152 and 154 are illustrated in FIG. 5 as being separate decisions, in other examples, the criteria listed in decision blocks 152 and 154 may be evaluated together. In such examples, if both criteria are satisfied, processing may proceed to process block 156 and if both criteria are not satisfied, processing may proceed to process block 158.

The partially-covered source tile merging technique described in FIG. 5 is described as using a cache unit that operates without an underlying memory for exemplary purposes. It should be understood that the technique described in FIG. 5 may use other types of memory devices, memory units, and/or memory subsystems in addition to or in lieu of a cache unit that operates without an underlying memory.

As shown in FIGS. 4 and 5, GPU 12 selectively discards from graphics pipeline 50 a source tile of samples associated with a tile location based on whether a conservative nearest z-value of the source tile is farther than a culling z-value associated with the tile location (100, 102, 104). For example, GPU 12 discards the source tile in response to determining that the conservative nearest z-value of the source tile is farther than the culling z-value associated with the tile location (100—YES, 102), and does not discard the source tile in response to determining that the conservative nearest z-value of the source tile is not farther than the culling z-value associated with the tile location (100—NO, 104).

As further shown in FIGS. 4 and 5, GPU 12 selectively merges a source tile of samples associated with a tile location with a merged source tile for the tile location to generate an updated version of the merged source tile based on whether the source tile is fully covered by a primitive that corresponds to the source tile and based on whether a conservative farthest z-value of the source tile is less than the culling z-value associated with the tile location (106, 108, 110, 112, 118). For example, GPU 12 merges the source tile with the merged source tile for the tile location in response to determining that the source tile is not fully covered by the primitive that corresponds to the source tile and that the conservative farthest z-value of the source tile is less than the culling z-value associated with the tile location (106—YES; 110—NO; 118), and does not merge the source tile with the merged source tile for the tile location in response to determining that the source tile is fully covered by the primitive corresponding to the source tile or that the conservative farthest z-value of the source tile is not less than the culling z-value associated with the tile location (106—NO, 108; 110—YES, 112).

As further shown in FIGS. 4 and 5, GPU 12 selectively sets the culling z-value equal to a conservative farthest z-value for the updated version of the merged source tile based on whether the updated version of the merged source tile is fully covered by a set of primitives that corresponds to the updated version of the merged source tile (120, 122). For example, GPU 12 sets the culling z-value equal to the conservative farthest z-value for the updated version of the merged source tile in response to determining that the updated version of the merged source tile is fully covered by the set of primitives (120—YES, 122), and does not set the culling z-value to be equal to the conservative farthest z-value for the updated version of the merged source tile in response to determining that the updated version of the merged source tile is not fully covered by the set of primitives (120—NO).

As further shown in FIGS. 4 and 5, GPU 12 generates a conservative farthest z-value for an updated version of the merged source tile based on the conservative farthest z-value of the source tile and a conservative farthest z-value for a previous version of the merged source tile (158). For example, GPU 12 may set the conservative farthest z-value for the updated version of the merged source tile equal to the maximum of (i.e., the farthest of) the conservative farthest z-value of the source tile and the conservative farthest z-value for a previous version of the merged source tile.

As further shown in FIGS. 4 and 5, GPU 12 generates a coverage mask for the updated version of the merged source tile based on a coverage mask for the source tile and a coverage mask for a previous version of the merged source tile (160). For example, GPU 12 may perform a bit-wise OR operation on the coverage mask for the partially-covered source tile with the coverage mask for the merged source tile to generate a coverage mask for the updated version of the merged source tile.

As further shown in FIGS. 4 and 5, GPU 12 selectively invalidates a cache line in a cache unit that stores a data record for the merged source tile based on whether the source tile is fully covered by the primitive that corresponds to the source tile (110, 116, 120, 124). For example, GPU 12 invalidates a cache line in response to determining that a source tile is fully covered by the primitive that corresponds to the source tile (110—YES, 116). As another example, GPU 12 selectively invalidates the cache line based on whether the updated version of the merged source tile is fully covered by the set of primitives corresponding to the updated version of the merged source tile in response to determining that the source tile is not fully covered by the primitive that corresponds to the source tile (120, 124). For example, GPU 12 invalidates the cache line in response to determining that the updated version of the merged source tile is fully covered by the set of primitives (120—YES, 124), and does not invalidate the cache line in response to determining that the updated version of the merged source tile is not fully covered by the set of primitives (120—NO).

Figure 6:
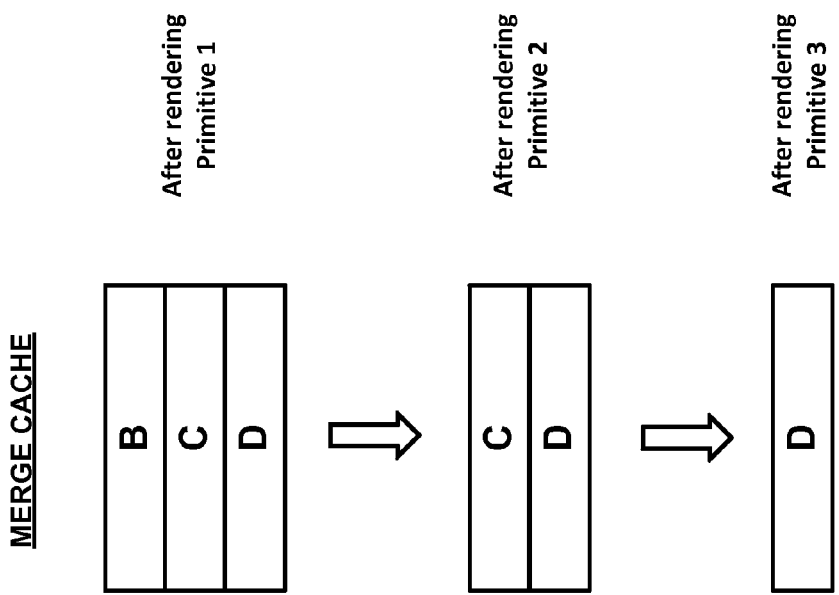
FIG. 6 is a conceptual diagram illustrating an example set of primitives to be rendered and corresponding merge cache states associated with rendering of the example set of primitives according to this disclosure.
Figure 6:
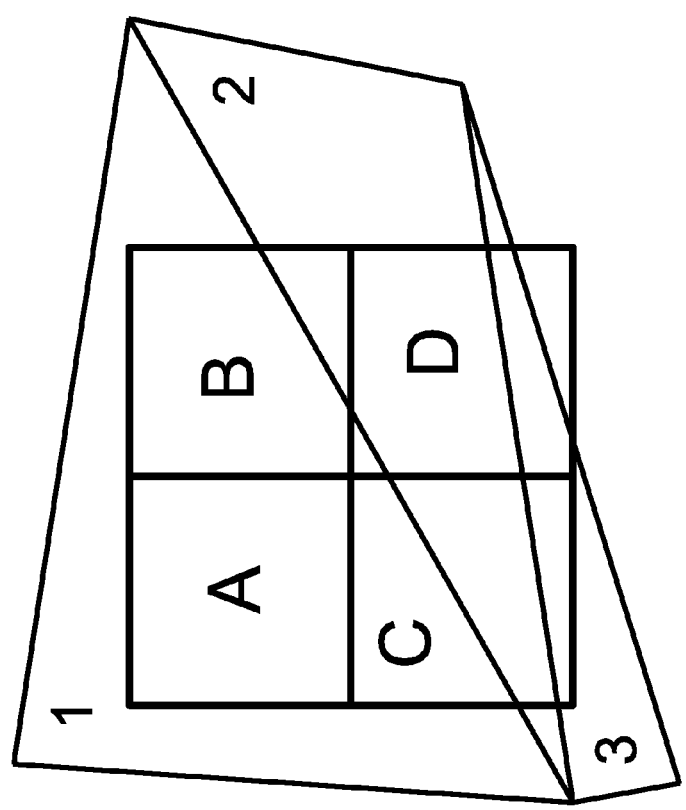

FIG. 6 is a conceptual diagram illustrating an example set of primitives to be rendered and corresponding merge cache states associated with rendering of the example set of primitives according to this disclosure. As shown in FIG. 6, the render target includes four tile locations (A, B, C, D) and three triangle primitives (1, 2, and 3). In this example, the primitives are rendered in numerical order. Each of the tile locations may correspond to a destination tile, one or more source tiles, and a merged source tile.

Primitive 1 fully covers source tile A and partially covers source tiles B, C, and D. No cache line is generated in the merge cache for the fully-covered source tile A. Instead, the conservative maximum z-value for source tile A may be used to directly update the culling z-value for tile location A (i.e., the conservative maximum z-value for destination tile A) without requiring any merging. A cache line is generated in the merge cache for each of partially-covered source tiles B, C, and D. As shown in FIG. 6, after rendering Primitive 1, the merge cache includes cache lines for merged source tiles B, C, and D.

Each of the cache lines may store a cache tag, an accumulated coverage mask, and an accumulated conservative maximum z-value for a respective merged source tile. Because Primitive 1 is the first primitive to be rendered, the accumulated coverage mask for each of the cache lines is set equal to the coverage mask of the corresponding source tile, and the accumulated conservative maximum z-value for each of the cache lines is set equal to the conservative maximum z-value of the corresponding source tile. For example, the accumulated source mask for cache line B is set equal to the coverage mask for source tile B that was generated when rendering Primitive 1 (i.e., a coverage mask that indicates which samples in source tile B are covered by Primitive 1). Similarly, the conservative maximum z-value for cache line B is set equal to the conservative maximum z-value for source tile B that was generated when rendering Primitive 1 (i.e., a value that is greater than or equal to the conservative maximum z-value for samples included in source tile B that are covered by Primitive 1).

After Primitive 1 is done rendering, primitive 2 is rendered. Primitive 2 partially covers source tiles B, C and D. Each of partially-covered source tiles B, C and D is merged with a corresponding merged source tile stored in the merge cache. For example, partially-covered source tile C for Primitive 2 is merged with the merged source tile stored in cache line C of the merge cache. The resulting accumulated coverage mask indicates which samples in tile C are covered by Primitive 1 and/or Primitive 2. The resulting accumulated conservative maximum z-value for merged source tile C indicates the conservative maximum z-value for the samples included in merged source tile C that are covered by Primitive 1 and/or Primitive 2.

After rendering Primitive 2, merged source tile B becomes a fully-covered tile. Therefore, cache line B is invalidated, which effectively removes merged source tile B from the merge cache. The conservative maximum z-value for merged source tile B may be used to update the culling z-value for tile location B (i.e., the conservative maximum z-value for destination tile B).

After rendering Primitive 2, merged source tile C and merged source tile D remain partially covered. Therefore, cache lines C and D remain in the merge cache.

After rendering Primitive 3, merged source tile C becomes a fully-covered merged source tile and merged source tile D remains a partially-covered tile. Therefore, cache line C is invalidated, and cache line D remains in the merge cache. Because merged source tile C is now fully covered, the conservative maximum z-value for merged source tile C may be used to update the culling z-value for tile location C (i.e., the conservative maximum z-value for destination tile C).

In some examples, the techniques of this disclosure may use a cache for merging partially-covered tiles when performing a hierarchical z-test. In graphics hardware, a hierarchical z-operation (alternatively, a low resolution z-operation) may be performed to reduce sample Z operation workload. A per-tile z-value (i.e., hierZ) may be stored in the memory in a hierarchical z-buffer when a tile has multiple samples. When a new tile is processed, one destination z value (i.e., hierZ) may be read from memory to perform the hierarchical z-test. If the hierarchical z-test is "pass" or "fail," per-sample z-values may not necessarily need to be read from the memory for the per-sample z-test. Such a scheme may reduce memory usage and improve performance. For example, when a new tile is processed, the maximum z-value of all samples that have been previously processed may be used as a hierarchical z-value for that tile. If the minimum z-value of the new tile is larger than the hierarchical z-value, then the new tile may be behind the old tile. In such a case, the z-test of all samples will fail and a per-sample z-test does not need to be performed. However, some systems may update hierarchical z-values, in some examples, only when the tile is fully covered by a primitive because the hierarchical z-value records the maximum z-values of all samples in that tile. This may reduce the efficiency of hierarchical z-testing because when objects are composed of lots of small triangles, most of tiles are not fully covered.

One solution is storing multiple z-values and per-sample masks in a hierarchical z-buffer in memory instead of a single maximum z-value as the hierarchical z-value. Such a solution may be able to update hierarchical z-values for partially-covered tiles to increase hierarchical z-test efficiency. However, such a solution may consume a significant amount of memory bandwidth.

In some examples, the techniques of this disclosure use an on-chip cache to merge partially-covered tiles. In such examples, one hierarchical z value per tile may be saved in a memory. If a tile is fully covered and the new maximum z-value of a tile (i.e., tileZ) is smaller than the hierarchical z-value (i.e., hierZ), the hierarchical z-value may be updated to equal the maximum z-value for the incoming tile (i.e., tileZ). If a tile is partially covered, tileZ, a per-sample mask for the incoming tile, and a tile coordinate may be sent to a cache. The screen coordinates of the tile may be used as a cache tag, and the per-tile hierarchical z-value (i.e., hierZ) and a sample mask may be stored in the cache lines.

When a cache hit occurs, the old sample mask may be merged with the new sample mask and the hierarchical z-value for the tile may be set equal to the maximum of the current hierarchical z-value and the maximum z-value for the incoming tile (i.e., hierZ=max(hierZ, tileZ)). After merging, if the tile is fully covered, the hierarchical z-value (i.e., hierZ) may be updated in the memory, and the cache line may be reset to invalidate the state. When a cache miss occurs, one cache line may be allocated for the new tileZ and sample mask. This scheme may achieve similar hierarchical z reject rate as storing multiple z-values and sample masks in a hierarchical z-buffer, but it may use less memory bandwidth.

In some examples, a low resolution z-buffer (i.e., LRZ buffer) stores per-tile LRZ values. In such examples, the per-tile LRZ values may be 16 bits. In such examples, for fully covered tiles, the LRZ buffer may be directly updated if he farthest z-value for the incoming source tile (i.e., srcZFar) is less than the farthest z-value for the destination tile (i.e., dstZFar) (i.e., srcZFar<dstZFar). For partially-covered tiles, a cache unit may be used to merge coverage masks.

In further examples, if tile-based rendering is used, the merging operations may occur in a binning pass during an LRZ building stage. In such examples, the merging operations may not necessarily need to occur during the rendering pass iterations.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. In some examples, the computer-readable medium may be a non-transitory computer-readable storage medium. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
 selectively merging, with a graphics processing unit (GPU), a source tile of samples associated with a tile location with a merged source tile for the tile location to generate an updated version of the merged source tile based on whether the source tile is fully covered by a primitive that corresponds to the source tile and based on whether a conservative farthest z-value of the source tile is nearer than a culling z-value associated with the tile location, the culling z-value being indicative of a conservative farthest z-value for all samples of a destination tile that corresponds to the tile location; and
 invalidating a cache line in a cache unit that stores a data record for the merged source tile in response to determining that the source tile is fully covered by the primitive that corresponds to the source tile.

2. The method of claim 1, wherein selectively merging the source tile comprises:

merging the source tile with the merged source tile for the tile location in response to determining that the source tile is not fully covered by the primitive that corresponds to the source tile and that the conservative farthest z-value of the source tile is nearer than the culling z-value associated with the tile location; and not merging the source tile with the merged source tile for the tile location in response to determining that the source tile is fully covered by the primitive that corresponds to the source tile or that the conservative farthest z-value of the source tile is not nearer than the culling z-value associated with the tile location.

3. The method of claim 2, wherein merging the source tile with the merged source tile for the tile location comprises:
generating a conservative farthest z-value for the updated version of the merged source tile based on the conservative farthest z-value for the source tile and a conservative farthest z-value for the merged source tile.

4. The method of claim 3, wherein merging the source tile with the merged source tile for the tile location further comprises:
generating a coverage mask for the updated version of the merged source tile based on a coverage mask for the source tile and a coverage mask for the merged source tile.

5. The method of claim 1, wherein the method further comprises:
storing a plurality of merged source tile data records in a memory,
wherein each of the merged source tile data records includes data associated with a merged source tile for a respective one of a plurality of tile locations of a render target, and
wherein the memory has a data capacity that is smaller than an amount of data required to store N merged source tile data records, where N is a total number of tile locations in the render target.

6. The method of claim 5, wherein the data associated with the merged source tile for the respective one of the plurality of tile locations comprises a conservative farthest z-value for the merged source tile associated with the respective tile location.

7. The method of claim 6, wherein the data associated with the merged source tile for the respective one of the plurality of tile locations further comprises a coverage mask for the merged source tile associated with the respective tile location.

8. The method of claim 5, wherein the memory comprises a cache unit that is not associated with an underlying memory.

9. The method of claim 1, further comprising:
storing a plurality of merged source tile data records in a cache unit,
wherein each of the merged source tile data records includes data associated with a merged source tile for a respective one of a plurality of tile locations of a render target,
wherein the cache unit is not associated with an underlying memory,
wherein the cache unit comprises a plurality of cache lines,
wherein each of the cache lines is configured to store a respective one of the merged source tile data records, and
wherein a total number of caches lines in the cache unit is less than a total number of tile locations in the render target.

10. The method of claim 1, further comprising:
storing a plurality of merged source tile data records in a cache unit,
wherein each of the merged source tile data records includes data associated with a merged source tile for a respective one of a plurality of tile locations of a render target,
wherein the cache unit comprises a plurality of cache lines,
wherein each of the cache lines is configured to store a respective one of the merged source tile data records,
wherein a total number of caches lines in the cache unit is less than a total number of tile locations in the render target,
wherein the cache unit is configured to write a first merged source tile data record associated with a first tile location to a cache line in the cache unit without writing the first data record to an underlying memory, and
wherein the cache unit is further configured to overwrite the first merged source tile data record with a second merged source tile data record associated with a second tile location without writing the first merged source tile data record to an underlying memory.

11. The method of claim 1, further comprising:
selectively discarding, from a graphics pipeline, the source tile associated with the tile location based on whether a conservative nearest z-value of the source tile is farther than the culling z-value associated with the tile location; and
selectively setting the culling z-value equal to a conservative farthest z-value for the updated version of the merged source tile based on whether the updated version of the merged source tile is fully covered by a set of primitives that corresponds to the updated version of the merged source tile.

12. The method of claim 11,
wherein selectively discarding, from the graphics pipeline, the source tile comprises:
discarding the source tile in response to determining that the conservative nearest z-value of the source tile is farther than the culling z-value associated with the tile location; and
not discarding the source tile in response to determining that the conservative nearest z-value of the source tile is not farther than the culling z-value associated with the tile location, and wherein selectively setting the culling z-value equal to the conservative farthest z-value for the updated version of the merged source tile comprises:
setting the culling z-value equal to the conservative farthest z-value for the updated version of the merged source tile in response to determining that the updated version of the merged source tile is fully covered by the set of primitives; and
not setting the culling z-value equal to the conservative farthest z-value for the updated version of the merged source tile in response to determining that the updated version of the merged source tile is not fully covered by the set of primitives.

13. A device comprising:
a graphics processing unit (GPU) configured to selectively merge a source tile of samples associated with a tile location with a merged source tile for the tile location to generate an updated version of the merged source tile based on whether the source tile is fully covered by a primitive that corresponds to the source tile and based on whether a conservative farthest z-value of the source tile is nearer than a culling z-value associated with the tile location, the culling z-value being indicative of a conservative farthest z-value for all samples of a destination tile that corresponds to the tile location and configured to invalidate a cache line in a cache unit that stores a data record for the merged source tile in response to determining that the source tile is fully covered by the primitive that corresponds to the source tile.

14. The device of claim 13, wherein the GPU is further configured to:
merge the source tile with the merged source tile for the tile location in response to determining that the source tile is not fully covered by the primitive that corresponds to the source tile and that the conservative farthest z-value of the source tile is nearer than the culling z-value associated with the tile location; and
not merge the source tile with the merged source tile for the tile location in response to determining that the source tile is fully covered by the primitive that corresponds to the source tile or that the conservative farthest z-value of the source tile is not nearer than the culling z-value associated with the tile location.

15. The device of claim 14, wherein the GPU is further configured to:
generate a conservative farthest z-value for the updated version of the merged source tile based on the conservative farthest z-value for the source tile and a conservative farthest z-value for the merged source tile.

16. The device of claim 15, wherein the GPU is further configured to:
generate a coverage mask for the updated version of the merged source tile based on a coverage mask for the source tile and a coverage mask for the merged source tile.

17. The device of claim 13, wherein the GPU is further configured to:
store a plurality of merged source tile data records in a memory,
wherein each of the merged source tile data records includes data associated with a merged source tile for a respective one of a plurality of tile locations of a render target, and
wherein the memory has a data capacity that is smaller than an amount of data required to store N merged source tile data records, where N is a total number of tile locations in the render target.

18. The device of claim 17, wherein the data associated with the merged source tile for the respective one of the plurality of tile locations comprises a conservative farthest z-value for the merged source tile associated with the respective tile location.

19. The device of claim 18, wherein the data associated with the merged source tile for the respective one of the plurality of tile locations further comprises a coverage mask for the merged source tile associated with the respective tile location.

20. The device of claim 17, wherein the memory comprises a cache unit that is not associated with an underlying memory.

21. The device of claim 13,
wherein the GPU is further configured to store a plurality of merged source tile data records in a cache unit,
wherein each of the merged source tile data records includes data associated with a merged source tile for a respective one of a plurality of tile locations of a render target,
wherein the cache unit is not associated with an underlying memory,
wherein the cache unit comprises a plurality of cache lines,
wherein each of the cache lines is configured to store a respective one of the merged source tile data records, and
wherein a total number of caches lines in the cache unit is less than a total number of tile locations in the render target.

22. The device of claim 13,
wherein the GPU is further configured to store a plurality of merged source tile data records in a cache unit,
wherein each of the merged source tile data records includes data associated with a merged source tile for a respective one of a plurality of tile locations of a render target,
wherein the cache unit comprises a plurality of cache lines,
wherein each of the cache lines is configured to store a respective one of the merged source tile data records,
wherein a total number of caches lines in the cache unit is less than a total number of tile locations in the render target,
wherein the cache unit is configured to write a first merged source tile data record associated with a first tile location to a cache line in the cache unit without writing the first data record to an underlying memory, and
wherein the cache unit is further configured to overwrite the first merged source tile data record with a second merged source tile data record associated with a second tile location without writing the first merged source tile data record to an underlying memory.

23. The device of claim 13, wherein the GPU is further configured to:
selectively discard, from a graphics pipeline, the source tile associated with the tile location based on whether a conservative nearest z-value of the source tile is farther than the culling z-value associated with the tile location; and
selectively set the culling z-value equal to a conservative farthest z-value for the updated version of the merged source tile based on whether the updated version of the merged source tile is fully covered by a set of primitives that corresponds to the updated version of the merged source tile.

24. The device of claim 23, wherein the GPU is further configured to:
discard the source tile in response to determining that the conservative nearest z-value of the source tile is farther than the culling z-value associated with the tile location;
not discard the source tile in response to determining that the conservative nearest z-value of the source tile is not farther than the culling z-value associated with the tile location;
set the culling z-value equal to the conservative farthest z-value for the updated version of the merged source tile in response to determining that the updated version of the merged source tile is fully covered by the set of primitives; and
not set the culling z-value equal to the conservative farthest z-value for the updated version of the merged source tile in response to determining that the updated version of the merged source tile is not fully covered by the set of primitives.

25. The device of claim 13, wherein the device comprises a wireless communication device.

26. The device of claim 13, wherein the device comprises a mobile phone handset.

* * * * *